(12) United States Patent
Gotoh et al.

(10) Patent No.: US 9,074,132 B2
(45) Date of Patent: *Jul. 7, 2015

(54) LIQUID CRYSTAL COMPOSITION AND LIQUID CRYSTAL DISPLAY DEVICE

(75) Inventors: Yasuyuki Gotoh, Tokyo (JP); Yukihiro Fujita, Chiba (JP); Takayoshi Yanai, Chiba (JP); Norikatsu Hattori, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 24 days.

This patent is subject to a terminal disclaimer.

(21) Appl. No.: 13/598,591

(22) Filed: Aug. 29, 2012

(65) Prior Publication Data

US 2013/0135575 A1  May 30, 2013

(30) Foreign Application Priority Data

Nov. 28, 2011 (JP) ................. 2011-259029
Apr. 10, 2012 (JP) ................. 2012-089083

(51) Int. Cl.
| | | |
|---|---|---|
| C09K 19/12 | (2006.01) | |
| C09K 19/34 | (2006.01) | |
| C09K 19/30 | (2006.01) | |
| C09K 19/14 | (2006.01) | |
| C09K 19/20 | (2006.01) | |
| C09K 19/32 | (2006.01) | |
| C09K 19/04 | (2006.01) | |

(52) U.S. Cl.
CPC ............. *C09K 19/14* (2013.01); *C09K 19/20* (2013.01); *C09K 19/32* (2013.01); *C09K 2019/0448* (2013.01); *C09K 2019/122* (2013.01); *C09K 2019/123* (2013.01); *C09K 2019/301* (2013.01); *C09K 2019/3016* (2013.01); *C09K 2019/3021* (2013.01); *C09K 2019/3025* (2013.01); *C09K 2019/3071* (2013.01); *C09K 2019/3078* (2013.01)

(58) Field of Classification Search
CPC ........ C09K 19/14; C09K 19/20; C09K 19/30; C09K 19/32; C09K 19/34; C09K 19/12; C09K 2019/0448; C09K 2019/122; C09K 2019/123; C09K 2019/301; C09K 2019/3016; C09K 2019/3021; C09K 2019/3025; C09K 2019/3071; C09K 2019/3078

USPC .............. 252/299.01, 299.6, 299.61, 299.63, 252/299.66; 482/1.1; 349/183, 187

See application file for complete search history.

(56) References Cited

U.S. PATENT DOCUMENTS

| | | | |
|---|---|---|---|
| 8,304,035 B2 * | 11/2012 | Bernatz et al. | ................. 428/1.1 |
| 2010/0304049 A1 | 12/2010 | Bernatz et al. | |
| 2010/0309423 A1 | 12/2010 | Bernatz et al. | |
| 2013/0134354 A1* | 5/2013 | Gotoh et al. | ............... 252/299.5 |

FOREIGN PATENT DOCUMENTS

| | | | |
|---|---|---|---|
| EP | 1889894 | 2/2008 | |
| JP | 2003-307720 | 10/2003 | |
| JP | 2004-131704 | 4/2004 | |
| JP | 2006-133619 | 5/2006 | |
| JP | 2010-275244 | 12/2010 | |
| WO | 2010131600 | 11/2010 | |
| WO | WO 2011/050893 A1 * | 5/2011 | ................. 349/182 |

OTHER PUBLICATIONS

"International Search Report (Form PCT/ISA/210)", mailed on Feb. 5, 2013, p. 1-p. 3.
"Written Opinion of the International Search Authority (PCT/ISA/237)", mailed on Feb. 5, 2013, p. 1-p.5.
"International Search Report (Form PCT/ISA/210)", published on Feb. 5, 2013, p. 1-p. 3.

* cited by examiner

*Primary Examiner* — Geraldina Visconti
(74) *Attorney, Agent, or Firm* — Jianq Chyun IP Office

(57) ABSTRACT

To provide a highly reactive polymerizable compound having a high solubility in a liquid crystal compound; a liquid crystal composition satisfying at least one characteristic such as a high maximum temperature of a nematic phase, a low minimum temperature thereof, a small viscosity, a suitable optical anisotropy, a large negative dielectric anisotropy and specific resistance, a high stability to ultraviolet light and heat, and having a suitable balance regarding at least two characteristics; a PSA device having a short response time, a large pretilt angle, a small residual monomer concentration, a large voltage holding ratio and contrast ratio and a long life; a polymerizable compound into which one bonding group or non-identical reaction group is introduced by constructing a polymer structure having a high polymerization degree in a PSA device manufacturing process to obtain a stable display, a liquid crystal composition containing thereof, and a liquid crystal device including thereof.

16 Claims, No Drawings

LIQUID CRYSTAL COMPOSITION AND LIQUID CRYSTAL DISPLAY DEVICE

CROSS-REFERENCE TO RELATED APPLICATIONS

This application claims the priority benefit of Japan application serial no. 2011-259029, filed on Nov. 28, 2011, and 2012-089083, filed on Apr. 10, 2012. The entirety of each of the above-mentioned patent applications is hereby incorporated by reference herein and made a part of this specification.

TECHNICAL FIELD

The invention relates to a liquid crystal composition containing a polymerizable compound that is polymerized, for example, by light or heat. The invention also relates to a liquid crystal display device in which the liquid crystal composition is sealed between substrates, and the polymerizable compound contained in the liquid crystal composition is polymerized while adjusting a voltage applied to a liquid crystal layer to immobilize alignment of liquid crystals.

As the technical field of the invention, the invention relates to a liquid crystal composition mainly suitable for use in an active matrix (AM) device and so forth, and an AM device and so forth including the composition. More specifically, the invention relates to a liquid crystal composition having a negative dielectric anisotropy, and a device and so forth that include the composition and have a mode such as an in-plane switching (IPS) mode, a fringe field switching (FFS) mode, a vertical alignment (VA) mode or a polymer sustained alignment (PSA) mode. The VA mode includes a multi-domain vertical alignment (MVA) mode and a patterned vertical alignment (PVA) mode.

BACKGROUND ART

In a liquid crystal display device, a classification based on an operating mode for liquid crystals includes a phase change (PC) mode, a twisted nematic (TN) mode, a super twisted nematic (STN) mode, an electrically controlled birefringence (ECB) mode, an optically compensated bend (OCB) mode, an in-plane switching (IPS) mode, a fringe field switching (FFS) mode, a vertical alignment (VA) mode and a polymer sustained alignment (PSA) mode. A classification based on a driving mode in the device includes a passive matrix (PM) and an active matrix (AM). The PM is classified into static, multiplex and so forth, and the AM is classified into a thin film transistor (TFT), a metal insulator metal (MIM) and so forth. The TFT is further classified into amorphous silicon and polycrystal silicon. The latter is classified into a high temperature type and a low temperature type according to a production process. A classification based on a light source includes a reflective type utilizing natural light, a transmissive type utilizing backlight and a transflective type utilizing both the natural light and the backlight.

The devices include a liquid crystal composition having suitable characteristics. The liquid crystal composition has a nematic phase. General characteristics of the composition should be improved to obtain an AM device having good general characteristics. Table 1 below summarizes a relationship of the general characteristics between two aspects. The general characteristics of the composition will be further explained based on a commercially available AM device. A temperature range of the nematic phase relates to a temperature range in which the device can be used. A preferred maximum temperature of the nematic phase is approximately 70° C. or higher and a preferred minimum temperature of the nematic phase is approximately −10° C. or lower. Viscosity of the composition relates to a response time in the device. A short response time is preferred for displaying moving images on the device. Accordingly, a small viscosity in the composition is preferred. A small viscosity at a low temperature is further preferred.

TABLE 1

General Characteristics of Composition and AM Device

| No. | General Characteristics of Composition | General Characteristics of AM Device |
|---|---|---|
| 1 | Wide temperature range of a nematic phase | Wide usable temperature range |
| 2 | Small viscosity[1] | Short response time |
| 3 | Suitable optical anisotropy | Large contrast ratio |
| 4 | Large positive or negative dielectric anisotropy | Low threshold voltage and small electric power consumption Large contrast ratio |
| 5 | Large specific resistance | Large voltage holding ratio and large contrast ratio |
| 6 | High stability to ultraviolet light and heat | Long service life |

[1] A liquid crystal composition can be injected into a liquid crystal cell in a shorter period of time.

An optical anisotropy of the composition relates to a contrast ratio in the device. A product (Δn×d) of the optical anisotropy (Δn) of the composition and a cell gap (d) in the device is designed so as to maximize the contrast ratio. A suitable value of the product depends on a type of operating mode. The suitable value is in the range of approximately 0.30 micrometer to approximately 0.40 micrometer in a device having the VA mode or the PSA mode, and in the range of approximately 0.20 micrometer to approximately 0.30 micrometer in a device having the IPS mode. In the above case, a composition having a large optical anisotropy is preferred for a device having a small cell gap. A large absolute value of dielectric anisotropy in the composition contributes to a low threshold voltage, a small electric power consumption and a large contrast ratio in the device. Accordingly, the large absolute value of dielectric anisotropy is preferred. A large specific resistance in the composition contributes to a large voltage holding ratio and a large contrast ratio in the device. Accordingly, a composition having a large specific resistance at room temperature and also at a high temperature in an initial stage is preferred. A composition having a large specific resistance at room temperature and also at a high temperature even after the device has been used for a long period of time is preferred. Stability of the composition to ultraviolet light and heat relates to a service life of the liquid crystal display device. In the case where the stability is high, the device has a long service life. Such characteristics are preferred for an AM device used in a liquid crystal projector, a liquid crystal television and so forth.

A composition having a positive dielectric anisotropy is used in an AM device having the TN mode. On the other hand, a composition having a negative dielectric anisotropy is used in an AM device having the VA mode. A composition having a positive or negative dielectric anisotropy is used in an AM device having the IPS mode and the FFS mode. A composition having a positive or negative dielectric anisotropy is used in an AM device having the PSA mode. Examples of the liquid crystal composition having the negative dielectric anisotropy are disclosed in Patent literatures No. 1 to No. 6 as described below and so forth.

CITATION LIST

Patent Literature

Patent literature No. 1: JP 2003-307720 A.
Patent literature No. 2: JP 2004-131704 A.
Patent literature No. 3: JP 2006-133619 A.
Patent literature No. 4: EP 1889894A.
Patent literature No. 5: JP 2010-537010 A.
Patent literature No. 6: JP 2010-537256 A.

A desirable AM device has characteristics such as a wide temperature range in which a device can be used, a short response time, a large contrast ratio, a low threshold voltage, a large voltage holding ratio and a long service life. A shorter response time even by one millisecond is desirable. Thus, desirable characteristics of a composition include a high maximum temperature of a nematic phase, a low minimum temperature of the nematic phase, a small viscosity, a suitable optical anisotropy, a large positive or negative dielectric anisotropy, a large specific resistance, a high stability to ultraviolet light and a high stability to heat.

In a display having a PSA mode, a small amount (approximately 0.3% by weight to approximately 1% by weight, for example) of a polymerizable compound (RM) is added to a liquid crystal composition. After introduction into a liquid crystal display cell, only the polymerizable compound is polymerized ordinarily under irradiation with ultraviolet light in a state in which a voltage is applied between electrodes to form a polymer structure within the device. As the RM, a polymerizable mesogenic or liquid crystal compound is known to be particularly suitable as a monomer to be added to the liquid crystal composition.

SUMMARY OF INVENTION

The inventors of the invention have diligently continued to conduct research for solving the problem, as a result, have found that a specific liquid crystal composition satisfies desirable characteristics and a liquid crystal display device including the composition exhibits an excellent performance, and thus have completed the invention based on the finding.

The invention concerns a liquid crystal composition containing at least one compound selected from the group of compounds represented by formula (1) as a first component and at least one compound selected from the group of compounds represented by formula (2) as a second component:

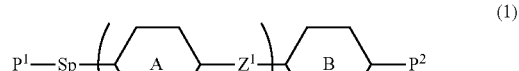

(1)

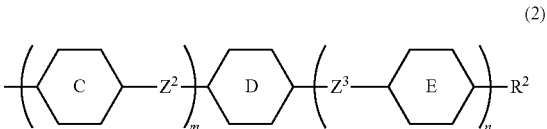

(2)

Wherein, for example, $P^1$ and $P^2$ are independently a group selected from groups represented by formula (P-1) to formula (P-6);

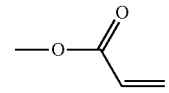
(P-1)

(P-2)

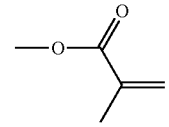
(P-3)

(P-4)

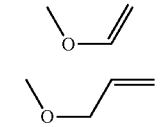
(P-5)

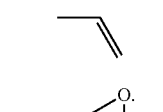
(P-6)

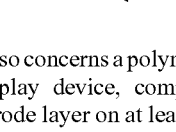

The invention also concerns a polymer sustained alignment liquid crystal display device, comprising two substrates including an electrode layer on at least one of the substrates, and arranging the liquid crystal composition between the two substrates.

The invention further concerns a method for manufacturing a liquid crystal display device, wherein a specific liquid crystal display device is manufactured by polymerizing a polymerizable compound by subjecting a specific liquid crystal compound arranged between two substrates to irradiation with light under a voltage application state.

The invention still further concerns use of the liquid crystal composition in the liquid crystal display device.

Technical Problem

In general, the polymerizable mesogenic or liquid crystal compound described above has a high capability for aligning liquid crystal molecules. On the other hand, the compound has a poor solubility in a liquid crystal composition, and cannot be added in a large amount. The solubility in the liquid crystal composition is improved by introducing a flexible bonding group such as alkylene or ester between ring structures. However, rigidity of molecules are weakened to decrease capability for aligning the liquid crystal molecules, and also to decrease a pretilt angle as an inclination of liquid crystal alignment. Moreover, a polymerizable compound into which two flexible bonding groups are introduced is poorly suitable for use in a display having a PSA mode because a rate of image sticking is large or the like.

One of the aims of the invention is to provide a liquid crystal composition satisfying at least one of characteristics such as a high maximum temperature of a nematic phase, a low minimum temperature of the nematic phase, a small viscosity, a suitable optical anisotropy, a large negative dielectric anisotropy, a large specific resistance, a high stability to ultraviolet light and a high stability to heat. Another aim is to provide a liquid crystal composition having a suitable balance regarding at least two of the characteristics. A further aim is to provide a liquid crystal display device including such a composition. A still further aim is to provide a composition having a suitable optical anisotropy to be a small optical anisotropy or a large optical anisotropy, a large negative dielectric anisotropy and a high stability to ultraviolet light and so forth, and is to provide an AM device having a short response time, a large pretilt angle, a small rate of image sticking, a small residual monomer concentration, a large voltage holding ratio, a large contrast ratio, a long service life and so forth by constructing a polymer structure in a liquid crystal layer.

Solution to Problem

The invention concerns a liquid crystal composition containing at least one compound selected from the group of compounds represented by formula (1) as a first component and at least one compound selected from the group of compounds represented by formula (2) as a second component, and a liquid crystal display device including the composition:

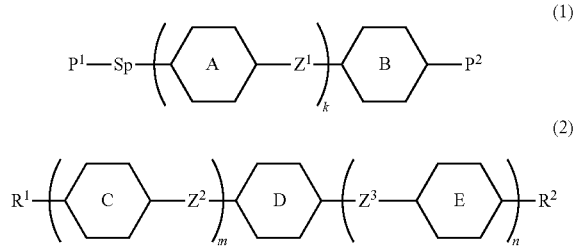

wherein $P^1$ and $P^2$ are independently a group selected from groups represented by formula (P-1) to formula (P-6);

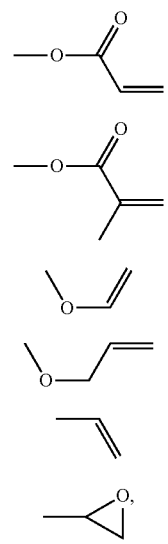

$R^1$ and $R^2$ are independently alkyl having 1 to 12 carbons, alkoxy having 1 to 12 carbons or alkenyl having 2 to 12 carbons; ring A and ring B are independently 1,4-cyclohexylene, 1,4-cyclohexenylene, 1,4-phenylene, tetrahydropyran-2,5-diyl, 1,3-dioxane-2,5-diyl or pyrimidine-2,5-diyl, and in the groups, at least one of hydrogen may be replaced by halogen or alkyl having 1 to 12 carbons, or alkyl having 1 to 12 carbons in which at least one of hydrogen is replaced by halogen; ring C and ring E are independently 1,4-cyclohexylene, tetrahydropyran-2,5-diyl, 1,4-phenylene, 2-fluoro-1,4-phenylene or 3-fluoro-1,4-phenylene; ring D is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; Sp is alkylene having 1 to 6 carbons, and in the alkylene, at least one of —$CH_2$— may be replaced by —O—, —OCO—, —COO— or —CH=CH—; $Z^1$, $Z^2$ and $Z^3$ are independently a single bond, ethylene, methyleneoxy or carbonyloxy; k is 0, 1, 2 or 3; m is 1, 2 or 3; and n is 0 or 1, and a sum of m and n is 3 or less.

The inventors of the invention have focused attention on a skeletal structure of a polymerizable compound for use in a liquid crystal display device to which a PSA technology is applied, and have found out that solubility in a liquid crystal composition or a pretilt angle is improved to effectively develop a PSA effect and to enhance capability for aligning liquid crystal molecules by introducing into one of the skeletal structures a bonding group such as alkylene, and a group in which —$CH_2$— in the alkylene is replaced by —O— or —CH=CH—, introducing a nonidentical reaction group thereinto or introducing a substituent into a ring structure.

In particular, the invention is significantly effective in improving performance of a VA liquid crystal display device to which the PSA technology is applied. The VA device using the PSA technology is a liquid crystal display apparatus having two substrates including transparent electrodes and alignment control films for aligning the liquid crystal molecules to be manufactured through a process for arranging between the substrates a liquid crystal composition containing the polymerizable compound, and polymerizing the polymerizable compound while applying a voltage between opposing transparent electrodes of the substrates.

According to the invention, a liquid crystal material in which an alignment state during voltage application is memorized in a polymeric component can be arranged between the substrates to memorize an inclination direction of sealed liquid crystal molecules and to shorten a response time, and thus a degree of image sticking can be improved.

In particular, use of the polymerizable compound of the invention allows a wide correspondence to a process for manufacturing a cell, and thus a high-definition liquid crystal display device can be manufactured.

Advantageous Effects of Invention

An advantage of the invention is a high stability of a polymer of a polymerizable mesogenic compound or liquid crystal compound to ultraviolet light or heat. Another advantage of the invention is a liquid crystal composition satisfying at least one of characteristics such as a high maximum temperature of a nematic phase, a low minimum temperature of the nematic phase, a small viscosity, a suitable optical anisotropy, a large negative dielectric anisotropy, a large specific resistance, a high stability to ultraviolet light and a high stability to heat. One aspect of the invention is a liquid crystal composition having a suitable balance regarding at least two of the characteristics. Another aspect is a liquid crystal display device including such a composition. A further aspect is a polymerizable compound having a high stability to ultraviolet light or heat, a composition having a suitable optical anisotropy, a large negative dielectric anisotropy, a high stability to ultraviolet light and so forth, and an AM device having a short response time, a suitable pretilt angle, a small rate of image sticking, a large voltage holding ratio, a large contrast ratio, a long service life and so forth.

DESCRIPTION OF EMBODIMENTS

Usage of terms herein is as described below. A liquid crystal composition or a liquid crystal display device of the invention may be abbreviated as "composition" or "device," respectively. The liquid crystal display device is a generic term for a liquid crystal display panel and a liquid crystal display module. "Liquid crystal compound" means a compound having a liquid crystal phase such as a nematic phase or a smectic phase, or a compound having no liquid crystal phase but being useful as a component of the composition. Such a useful compound has a six-membered ring such as 1,4-cyclohexylene and 1,4-phenylene, and a rod-like molecular structure. An optically active compound and a polymerizable compound may occasionally be added to the composition. Even in the case where the compounds are liquid crystalline, the compounds are classified as an additive herein. At least one compound selected from the group of compounds represented by formula (1) may be abbreviated as "compound (1)." "Compound (1)" means one compound or two or more compounds represented by formula (1). A same rule also applies to any other compound represented by any other formula. At least one group selected from groups represented by formula (P-1) may be abbreviated as "group (P-1)." A same rule also applies to any other group represented by any other formula. "At least one" described prior to "replaced" indicates an arbitrary selection of not only positions but also numbers.

A higher limit of a temperature range of the nematic phase may be abbreviated as "maximum temperature." A lower limit of the temperature range of the nematic phase may be abbreviated as "minimum temperature." An expression "having a large specific resistance" means that the composition has a large specific resistance at room temperature and also at a temperature close to the maximum temperature of the nematic phase in an initial stage, and that the composition has a large specific resistance at room temperature and also at a temperature close to the maximum temperature of the nematic phase even after the device has been used for a long period of time. An expression "having a large voltage holding ratio" means that the device has a large voltage holding ratio at room temperature and also at a temperature close to the maximum temperature of the nematic phase in an initial stage, and that the device has a large voltage holding ratio at room temperature and also at a temperature close to the maximum temperature of the nematic phase even after the device has been used for a long period of time. When characteristics such as an optical anisotropy are explained, values obtained according to the measuring methods described in Examples will be used. A first component includes one compound or two or more compounds. "Ratio of the first component" is expressed in terms of a weight ratio (part by weight) of the first component based on 100 parts by weight of a liquid crystal composition excluding the first component and a polymerizable compound other than the first component. "Ratio of a second component" is expressed in terms of weight percent (% by weight) of the second component based on the weight of the liquid crystal composition excluding the first component and the polymerizable compound other than the first component. "Ratio of a third component" is expressed in a manner similar to "ratio of the second component." A ratio of the additive mixed with the composition is expressed in terms of weight percent (% by weight) or weight parts per million (ppm) based on the total weight of the liquid crystal composition. "Ratio of the polymerizable compound other than the first component" is expressed in terms of a weight ratio (part by weight) of the polymerizable compound other than the first component based on 100 parts by weight of the liquid crystal composition excluding the first component and the polymerizable compound other than the first component.

A symbol $R^1$ is used for a plurality of compounds in chemical formulas of component compounds. In two of arbitrary compounds among the plurality of compounds, a group to be selected by $R^1$ may be identical or different. In one case, for example, $R^1$ of compound (2) is ethyl and $R^1$ of compound (2-1) is ethyl. In another case, $R^1$ of compound (2) is ethyl and $R^1$ of compound (2-1) is propyl. A same rule also applies to a symbol $R^2$, $X^1$, $Y^1$ or the like.

The invention includes the items described below. Item 1. A liquid crystal composition containing at least one compound selected from the group of compounds represented by formula (1) as a first component and at least one compound selected from the group of compounds represented by formula (2) as a second component:

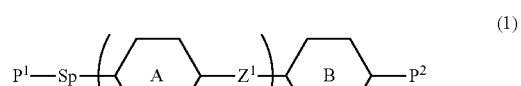

(1)

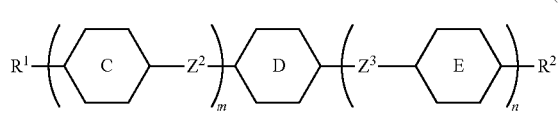

(2)

wherein $P^1$ and $P^2$ are independently a group selected from groups represented by formula (P-1) to formula (P-6);

(P-1)

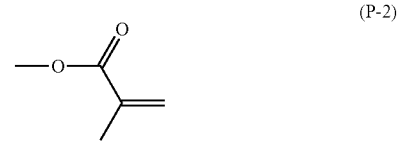

(P-2)

(P-3)

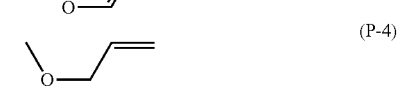

(P-4)

(P-5)

(P-6)

$R^1$ and $R^2$ are independently alkyl having 1 to 12 carbons, alkoxy having 1 to 12 carbons or alkenyl having 2 to 12 carbons; ring A and ring B are independently 1,4-cyclohexylene, 1,4-cyclohexenylene, 1,4-phenylene, tetrahydropyran-2,5-diyl, 1,3-dioxane-2,5-diyl or pyrimidine-2,5-diyl, and in the groups, at least one of hydrogen may be replaced by halogen or alkyl having 1 to 12 carbons, or alkyl having 1 to 12 carbons in which at least one of hydrogen is replaced by halogen; ring C and ring E are independently 1,4-cyclohexylene, tetrahydropyran-2,5-diyl, 1,4-phenylene, 2-fluoro-1,4-phenylene or 3-fluoro-1,4-phenylene; ring D is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; Sp is alkylene having 1 to 6 carbons, and in the alkylene, at least one of —CH$_2$— may be replaced by —O—, —OCO—, —COO— or —CH=CH—; $Z^1$, $Z^2$ and $Z^3$ are independently a single bond, ethylene, methyleneoxy or carbonyloxy; k is 0, 1, 2 or 3; m is 1, 2 or 3; and n is 0 or 1, and a sum of m and n is 3 or less.

Item 2. The liquid crystal composition according to item 1, wherein the first component is at least one compound selected from the group of compounds represented by formula (1-1) to formula (1-8):

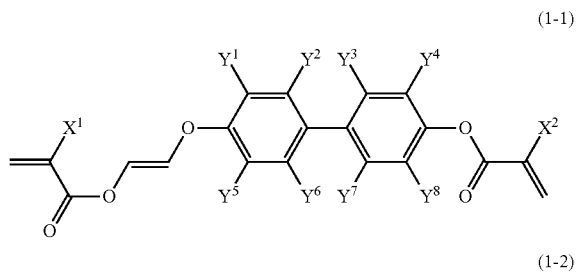
(1-1)

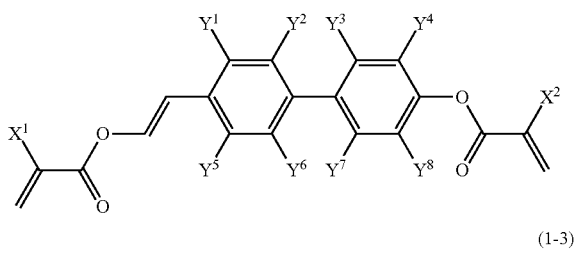
(1-2)

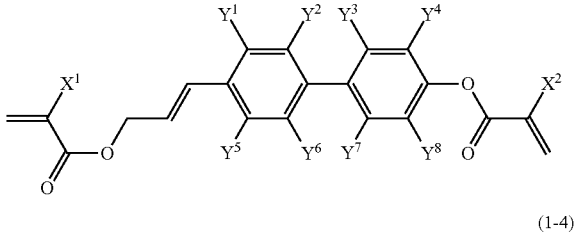
(1-3)

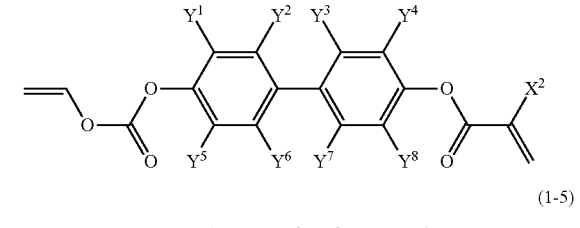
(1-4)

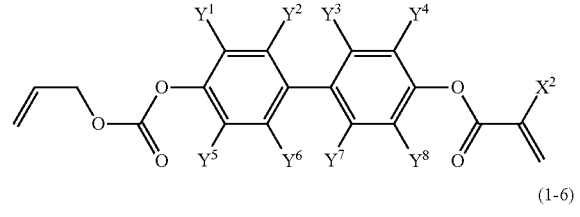
(1-5)

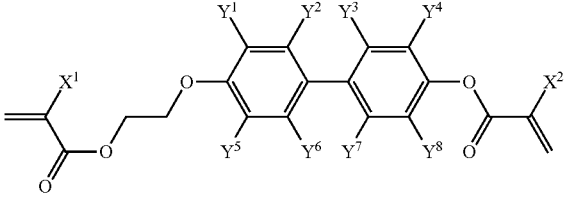
(1-6)

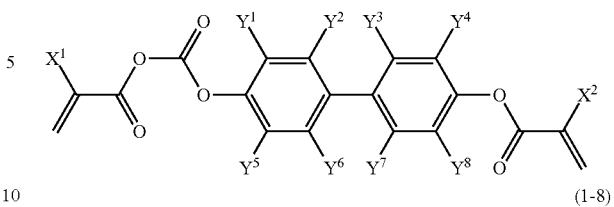
(1-7)

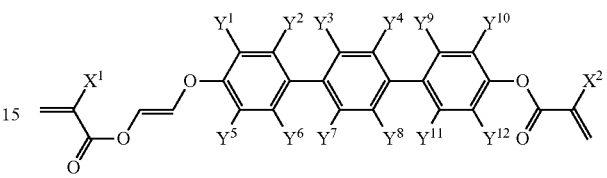
(1-8)

wherein $Y^1$ to $Y^{12}$ are independently hydrogen, halogen, alkyl having 1 to 12 carbons or trifluoromethyl; and $X^1$ and $X^2$ are independently hydrogen or methyl.

Item 3. The liquid crystal composition according to item 1, wherein the first component is at least one compound selected from the group of compounds represented by formula (1-1) to formula (1-8) according to item 2, and $Y^1$ to $Y^{12}$ are hydrogen.

Item 4. The liquid crystal composition according to item 1, wherein the first component is at least one compound selected from the group of compounds represented by formula (1-1) to formula (1-8) according to item 2, in formula (1-1) to formula (1-7), at least one of $Y^1$ to $Y^8$ is fluorine or trifluoromethyl, and in formula (1-8), at least one of $Y^1$ to $Y^{12}$ is fluorine or trifluoromethyl.

Item 5. The liquid crystal composition according to any one of items 1 to 4, wherein the first component is at least one compound selected from the group of compounds represented by formula (1-1) according to item 2.

Item 6. The liquid crystal composition according to any one of items 1 to 4, wherein the first component is at least one compound selected from the group of compounds represented by formula (1-2) according to item 2.

Item 7. The liquid crystal composition according to any one of items 1 to 6, wherein the first component comprises at least two or more compounds selected from the group of compounds represented by formula (1) according to item 1.

Item 8. The liquid crystal composition according to anyone of items 1 to 7, wherein the first component is at least one compound selected from the group of compounds represented by formula (1) according to item 1, and further contains a polymerizable compound other than the compounds represented by formula (1) according to item 1.

Item 9. The liquid crystal composition according to any one of items 1 to 8, wherein the second component is at least one compound selected from the group of compounds represented by formula (2-1) to formula (2-19):

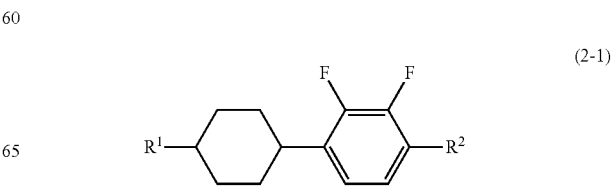
(2-1)

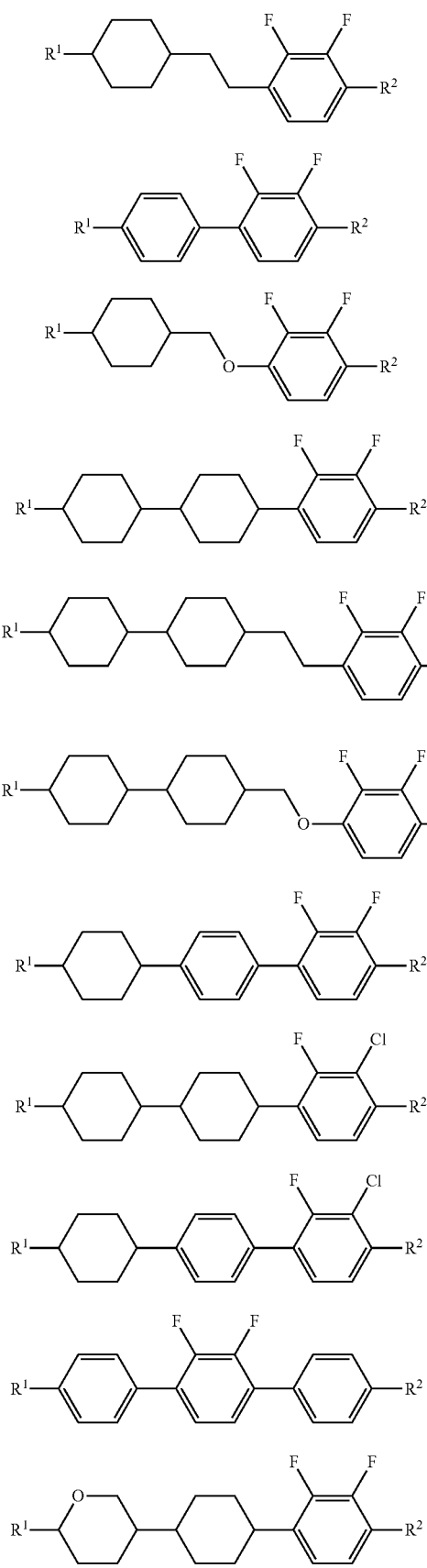
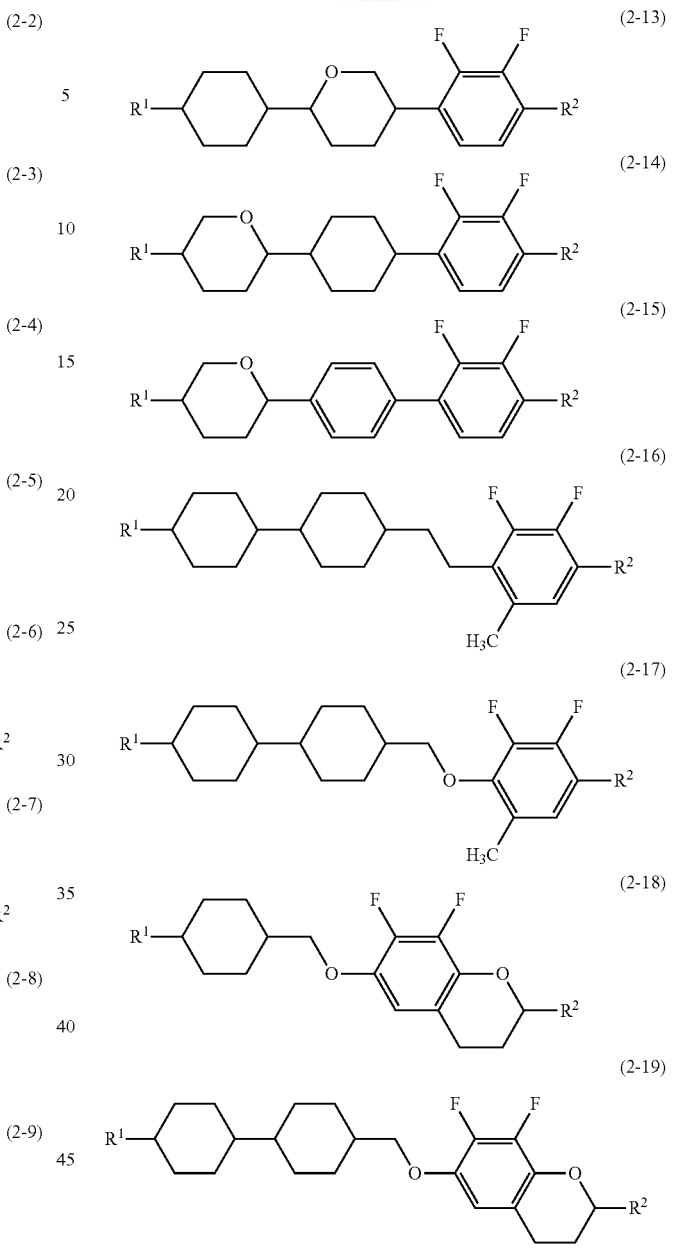

wherein $R^1$ and $R^2$ are independently alkyl having 1 to 12 carbons, alkoxy having 1 to 12 carbons or alkenyl having 2 to 12 carbons.

Item 10. The liquid crystal composition according to item 1, wherein the second component is at least one compound selected from the group of compounds represented by formula (2-3) according to item 9.

Item 11. The liquid crystal composition according to item 1, wherein the second component is at least one compound selected from the group of compounds represented by formula (2-5) according to item 9.

Item 12. The liquid crystal composition according to item 1, wherein the second component is at least one compound selected from the group of compounds represented by formula (2-7) according to item 9.

Item 13. The liquid crystal composition according to item 1, wherein the second component is at least one compound selected from the group of compounds represented by formula (2-13) according to item 9.

Item 14. The liquid crystal composition according to any one of items 1 to 13, further containing at least one compound selected from the group of compounds represented by formula (3) as a third component:

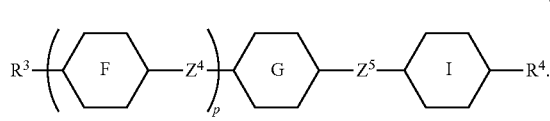

wherein $R^3$ and $R^4$ are independently alkyl having 1 to 12 carbons, alkoxy having 1 to 12 carbons or alkenyl having 2 to 12 carbons, or alkenyl having 2 to 12 carbons in which at least one of hydrogen is replaced by fluorine; ring F, ring G and ring I are independently 1,4-cyclohexylene, 1,4-phenylene, 2-fluoro-1,4-phenylene or 3-fluoro-1,4-phenylene; $Z^4$ and $Z^5$ are independently a single bond, ethylene, methyleneoxy or carbonyloxy; and p is 0, 1 or 2.

Item 15. The liquid crystal composition according to item 14, wherein the third component is at least one compound selected from the group of compounds represented by formula (3-1) to formula (3-13):

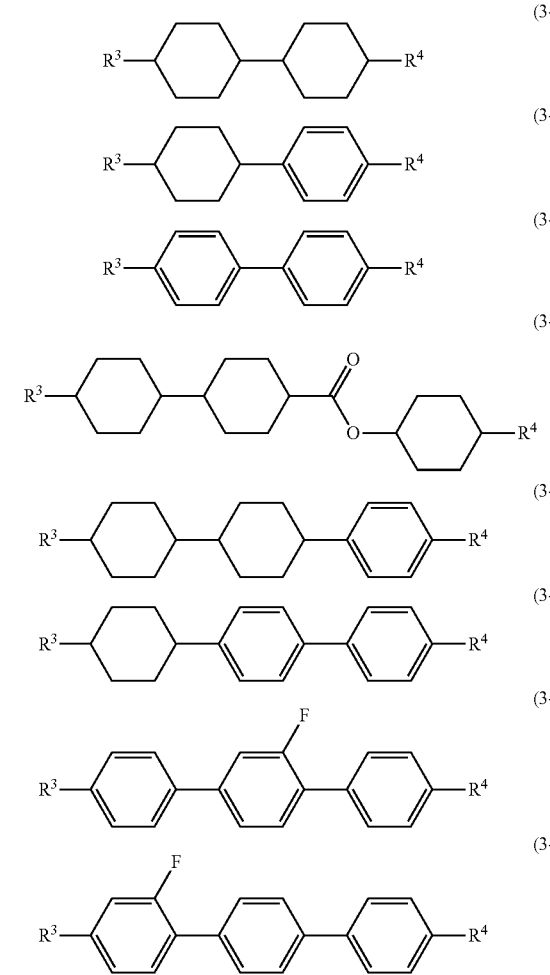

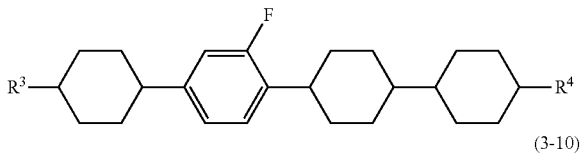

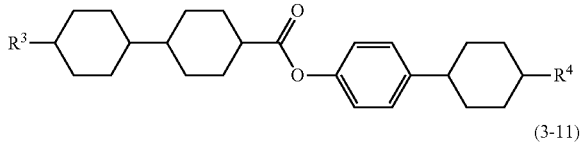

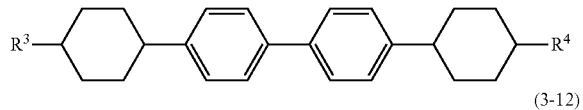

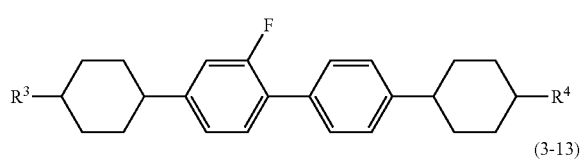

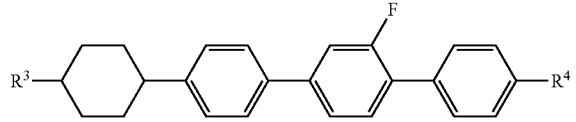

wherein $R^3$ and $R^4$ are independently alkyl having 1 to 12 carbons, alkoxy having 1 to 12 carbons or alkenyl having 2 to 12 carbons, or alkenyl having 2 to 12 carbons in which at least one of hydrogen is replaced by fluorine.

Item 16. The liquid crystal composition according to item 14, wherein the third component is at least one compound selected from the group of compounds represented by formula (3-1) according to item 15.

Item 17. The liquid crystal composition according to item 14, wherein the third component is at least one compound selected from the group of compounds represented by formula (3-7) according to item 15.

Item 18. The liquid crystal composition according to any one of items 14 to 17, wherein a ratio of the second component is in the range of 10% by weight to 80% by weight, and a ratio of the third component is in the range of 20% by weight to 90% by weight, based on the weight of a liquid crystal composition excluding the first component and a polymerizable compound other than the first component, and a ratio of the first component and the polymerizable compound other than the first component is in the range of 0.03 part by weight to 10 parts by weight based on 100 parts by weight of the liquid crystal composition excluding the first component and the polymerizable compound other than the first component.

Item 19. The liquid crystal composition according to any one of items 1 to 18, further containing a polymerization initiator.

Item 20. The liquid crystal composition according to any one of items 1 to 19, further containing a polymerization inhibitor.

Item 21. The liquid crystal composition according to any one of items 1 to 20, wherein a maximum temperature of a nematic phase is 70° C. or higher, an optical anisotropy (25° C.) at a wavelength of 589 nanometers is 0.08 or more, and a dielectric anisotropy (25° C.) at a frequency of 1 kHz is −2 or less.

Item 22. A polymer sustained alignment (PSA) liquid crystal display device, comprising two substrates including an electrode layer on at least one of the substrates, and arranging between the two substrates a liquid crystal material containing a compound in which a polymerizable compound in the liquid crystal composition according to any one of items 1 to 21 is polymerized.

Item 23. The liquid crystal display device according to item 22, wherein an operating mode in the liquid crystal display device is a TN mode, a VA mode, an OCB mode, an IPS mode or a FFS mode, and a driving mode in the liquid crystal display device is an active matrix mode.

Item 24. A method for manufacturing a liquid crystal display device, wherein the liquid crystal display device according to item 22 is manufactured by polymerizing the polymerizable compound by subjecting the liquid crystal compound according to any one of items 1 to 21 as arranged between two substrates to irradiation with light under a voltage application state.

Item 25. Use of the liquid crystal composition according to any one of items 1 to 21 in a liquid crystal display device.

The invention also includes the following items: (1) the composition, further containing the optically active compound; (2) the composition, further containing the additive such as an antioxidant, an ultraviolet light absorber or an antifoaming agent; (3) an AM device including the composition; (4) a device including the composition, and having a TN, an ECB, an OCB, an IPS, a FFS, a VA or a PSA mode; (5) a transmissive device including the composition; (6) use of the composition as the composition having the nematic phase; and (7) use as an optically active composition by adding the optically active compound to the composition.

The composition of the invention will be explained in the following order. First, a constitution of the component compounds in the composition will be explained. Second, main characteristics of the component compounds and main effects of the compounds on the composition will be explained. Third, a combination of components in the composition, a preferred ratio of the components and the basis thereof will be explained. Fourth, a preferred embodiment of the component compounds will be explained. Fifth, specific examples of the component compounds will be shown. Sixth, the additive that may be mixed with the composition will be explained. Seventh, methods for synthesizing the component compounds will be explained. Last, an application of the composition will be explained.

First, the constitution of the component compounds in the composition will be explained. The composition of the invention is classified into composition A and composition B. Composition A may further contain any other liquid crystal compound, the additive and an impurity, in addition to the liquid crystal compound selected from compound (1), compound (2) and compound (3). "Any other liquid crystal compound" means a liquid crystal compound different from compound (1), compound (2) and compound (3). Such a compound is mixed with the composition for the purpose of further adjusting the characteristics. Of any other liquid crystal compounds, a ratio of a cyano compound is preferably as small as possible in view of stability to heat or ultraviolet light. A further preferred ratio of the cyano compound is 0% by weight. The additive includes the optically active compound, the antioxidant, the ultraviolet light absorber, a dye, the antifoaming agent and the polymerization initiator. The impurity includes a compound mixed in a process such as preparation of the component compounds. Even in the case where the compound is liquid crystalline, the compound is classified as the impurity herein.

Composition B consists essentially of compound (1), compound (2) and compound (3). A term "essentially" means that the composition may also contain the additive and the impurity, but does not contain any liquid crystal compound different from the compounds. Composition B has a smaller number of components than composition A has. Composition B is preferred to composition A in view of cost reduction. Composition A is preferred to composition B in view of possibility of further adjusting physical properties by mixing any other liquid crystal compound.

Second, the main characteristics of the component compounds and the main effects of the compounds on the characteristics of the composition will be explained. The main characteristics of the component compounds are summarized in Table 2 on the basis of advantageous effects of the invention. In Table 2, a symbol L stands for "large" or "high," a symbol M stands for "medium," and a symbol S stands for "small" or "low." The symbols L, M and S represent a classification based on a qualitative comparison among the component compounds, and 0 (zero) means "a value is close to zero."

TABLE 2

| Characteristics of Compounds | | |
| --- | --- | --- |
| Compounds | Compound (2) | Compound (3) |
| Maximum temperature | S to L | S to L |
| Viscosity | M to L | S to M |
| Optical anisotropy | M to L | S to L |
| Dielectric anisotropy | M to L[1)] | 0 |
| Specific resistance | L | L |

[1)]A value of dielectric anisotropy is negative, and the symbol shows magnitude of an absolute value.

Upon mixing the component compounds with the composition, the main effects of the component compounds on the characteristics of the composition are as described below. Compound (2) increases the absolute value of dielectric anisotropy, and decreases the minimum temperature. Compound (3) decreases the viscosity, or increases the maximum temperature and decreases the minimum temperature.

Third, the combination of components in the composition, the preferred ratio of the components and the basis thereof will be explained. The combination of the components in the composition includes a combination of the first component and the second component, and a combination of the first component, the second component and the third component.

A preferred ratio of the first compound is approximately 0.05 part by weight or more for aligning liquid crystal molecules, and approximately 10 parts by weight or less for avoiding a poor display, based on 100 parts by weight of the liquid crystal composition excluding the first component. A further preferred ratio is in the range of approximately 0.1 part by weight to approximately 2 parts by weight.

A preferred ratio of the second component is approximately 10% by weight or more for increasing the absolute value of dielectric anisotropy, and approximately 80% by weight or less for decreasing the minimum temperature, based on the liquid crystal composition excluding the first component. A further preferred ratio is in the range of approximately 15% by weight to approximately 70% by weight. A particularly preferred ratio is in the range of approximately 20% by weight to approximately 60% by weight.

A preferred ratio of the third component is approximately 20% by weight or more for decreasing the viscosity or increasing the maximum temperature, and approximately 90% or less for increasing the absolute value of dielectric anisotropy, based on the liquid crystal composition excluding the first component. A further preferred ratio is in the range of approximately 30% by weight to approximately 80% by weight. A particularly preferred ratio is in the range of approximately 40% by weight to approximately 70% by weight.

Fourth, the preferred embodiment of the component compounds will be explained.

$R^1$ and $R^2$ are independently alkyl having 1 to 12 carbons, alkoxy having 1 to 12 carbons or alkenyl having 2 to 12 carbons. Preferred $R^1$ or $R^2$ is alkyl having 1 to 12 carbons for increasing the stability to ultraviolet light or heat, and alkoxy having 1 to 12 carbons for decreasing the viscosity.

$R^3$ and $R^4$ are independently alkyl having 1 to 12 carbons, alkoxy having 1 to 12 carbons or alkenyl having 2 to 12 carbons, or alkenyl having 2 to 12 carbons in which at least one of hydrogen is replaced by fluorine. Preferred $R^3$ or $R^4$ is alkenyl having 2 to 12 carbons for decreasing the viscosity, and alkyl having 1 to 12 carbons for increasing the stability to ultraviolet light, or for increasing the stability to heat.

Preferred alkyl is methyl, ethyl, propyl, butyl, pentyl, hexyl, heptyl or octyl. Further preferred alkyl is ethyl, propyl, butyl, pentyl or heptyl for decreasing the viscosity.

Preferred alkoxy is methoxy, ethoxy, propoxy, butoxy, pentyloxy, hexyloxy or heptyloxy. Further preferred alkoxy is methoxy or ethoxy for decreasing the viscosity.

Preferred alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. Further preferred alkenyl is vinyl, 1-propenyl, 3-butenyl or 3-pentenyl for decreasing the viscosity. A preferred configuration of —CH═CH— in the alkenyl depends on a position of a double bond. Trans is preferred in the alkenyl such as 1-propenyl, 1-butenyl, 1-pentenyl, 1-hexenyl, 3-pentenyl and 3-hexenyl for decreasing the viscosity, for instance. C is preferred in the alkenyl such as 2-butenyl, 2-pentenyl and 2-hexenyl. In the alkenyl, straight-chain alkenyl is preferred to branched-chain alkenyl.

Preferred examples of alkenyl in which at least one of hydrogen is replaced by fluorine include 2,2-difluorovinyl, 3,3-difluoro-2-propenyl, 4,4-difluoro-3-butenyl, 5,5-difluoro-4-pentenyl and 6,6-difluoro-5-hexenyl. Further preferred examples include 2,2-difluorovinyl and 4,4-difluoro-3-butenyl for decreasing the viscosity.

Alkyl does not include cyclic alkyl. Alkoxy does not include cyclic alkoxy. Alkenyl does not include cyclic alkenyl. With regard to a configuration of 1,4-cyclohexylene, trans is preferred to cis for increasing the maximum temperature.

Sp is alkylene having 1 to 6 carbons, and in the alkylene, at least one of —CH$_2$— may be replaced by —O—, —OCO—, —COO— or —CH═CH—. Preferred Sp is alkylene having 1 to 6 carbons for increasing the stability to ultraviolet light or heat, and alkylene in which —CH$_2$— is replaced by —CH═CH— for increasing solubility in the liquid crystal composition. With regard to a configuration of —CH═CH—, cis may be and trans may be.

$P^1$ and $P^2$ are independently a group selected from groups represented by formula (P-1) to formula (P-6):

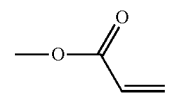 (P-1)

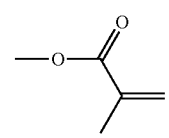 (P-2)

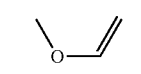 (P-3)

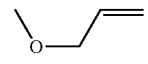 (P-4)

(P-5)

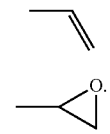 (P-6)

Preferred $P^1$ or $P^2$ is group (P-1) and group (P-2) for increasing reactivity or shortening a response time, group (P-5) for increasing the solubility in the liquid crystal composition, and group (P-3) and group (P-4) for increasing the stability to ultraviolet light or heat.

Ring A and ring B are independently 1,4-cyclohexylene, 1,4-cyclohexenylene, 1,4-phenylene, tetrahydropyran-2,5-diyl, 1,3-dioxane-2,5-diyl and pyrimidine-2,5-diyl, and in the rings, at least one of hydrogen may be replaced by halogen or alkyl having 1 to 12 carbons, or alkyl having 1 to 12 carbons in which at least one of hydrogen is replaced by halogen, and two of arbitrary ring A when k is 2 or 3 may be identical or different. Preferred ring A or ring B is 1,4-phenylene in which at least one of hydrogen may be replaced by halogen or alkyl having 1 to 12 carbons, or alkyl having 1 to 12 carbons in which at least one of hydrogen is replaced by halogen for shortening a response time. Further preferred ring A or ring B is 1,4-phenylene. Ring C and ring E are independently 1,4-cyclohexylene, tetrahydropyran-2,5-diyl, 1,4-phenylene, 2-fluoro-1,4-phenylene or 3-fluoro-1,4-phenylene, and two of arbitrary ring C when m is 2 or 3 may be identical or different. Preferred ring C or ring E is 1,4-cyclohexylene for decreasing the viscosity, tetrahydropyran-2,5-diyl for increasing the absolute value of dielectric anisotropy, and 1,4-phenylene for increasing the optical anisotropy. Tetrahydropyran-2,5-diyl includes:

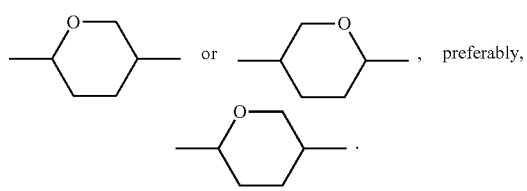

Ring D is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl. Preferred ring D is 2,3-difluoro-1,4-phenylene for decreasing the viscosity, 2-chloro-3-fluoro-1,4-phenylene for decreasing the optical anisotropy, and 7,8-difluorochroman-2,6-diyl for increasing the absolute value of dielectric anisotropy.

Ring F, ring G and ring I are independently 1,4-cyclohexylene, 1,4-phenylene, 2-fluoro-1,4-phenylene or 3-fluoro-1,4-phenylene, and two of arbitrary ring F when p is 2 may be identical or different. Preferred ring F, ring G or ring I is 1,4-cyclohexylene for decreasing the viscosity or increasing the maximum temperature, and 1,4-phenylene for decreasing the minimum temperature.

$Z^1$, $Z^2$ and $Z^3$ are independently a single bond, ethylene, methyleneoxy or carbonyloxy, two of arbitrary $Z^1$ when k is 2 or 3 may be identical or different, and two of arbitrary $Z^2$ when m is 2 or 3 may be identical or different. Preferred $Z^1$ is a single bond for increasing the reactivity, and ethylene for increasing the solubility in the liquid crystal composition. Preferred $Z^2$ or $Z^3$ is a single bond for decreasing the viscosity, ethylene for decreasing the minimum temperature, and methyleneoxy for increasing the absolute value of dielectric anisotropy.

$Z^4$ and $Z^5$ are independently a single bond, ethylene, methyleneoxy or carbonyloxy, and two of $Z^4$ when p is 2 may be identical or different. Preferred $Z^4$ or $Z^5$ is a single bond for decreasing the viscosity, ethylene for decreasing the minimum temperature, and carbonyloxy for increasing the maximum temperature.

$Y^1$ to $Y^{12}$ are independently hydrogen, halogen, alkyl having 1 to 12 carbons or trifluoromethyl. Preferred $Y^1$ to $Y^{12}$ are hydrogen for increasing the reactivity, and halogen or trifluoromethyl for increasing the solubility in the liquid crystal composition.

$X^1$ and $X^2$ are independently hydrogen or methyl. Preferred $X^1$ or $X^2$ is methyl for increasing the reactivity, and hydrogen for increasing the stability to ultraviolet light.

Then, k is 0, 1, 2 or 3. Preferred k is 1 for increasing the reactivity. Moreover, m is 1, 2 or 3. Preferred m is 1 for decreasing the viscosity, and 2 or 3 for increasing the maximum temperature.

Further, n is 0 or 1. Preferred n is 0 for decreasing the viscosity, and 1 for decreasing the minimum temperature.

Furthermore, p is 0, 1 or 2. Preferred p is 0 for decreasing the viscosity, and 1 or 2 for increasing the maximum temperature.

Fifth, the specific examples of the component compounds will be shown. In the preferred compounds described below, $R^5$ and $R^8$ are straight-chain alkyl having 1 to 12 carbons, straight-chain alkoxy having 1 to 12 carbons or straight-chain alkenyl having 2 to 12 carbons. $R^6$ is straight-chain alkyl having 1 to 12 carbons or straight-chain alkoxy having 1 to 12 carbons. $R^7$ is straight-chain alkyl having 1 to 12 carbons or straight-chain alkenyl having 2 to 12 carbons. $Y^4$ is hydrogen, halogen, alkyl having 1 to 12 carbons or trifluoromethyl. $X^1$ and $X^2$ are hydrogen or methyl.

Preferred compound (1) includes compound (1-1-1) to compound (1-8-1). Further preferred compound (1) includes compound (1-1-1) to compound (1-5-1) and compound (1-8-1). Particularly preferred compound (1) includes compound (1-1-1) and compound (1-2-1). Preferred compound (2) includes compound (2-1-1) to compound (2-19-1). Further preferred compound (2) includes compound (2-1-1) to compound (2-10-1), and compound (2-12-1) to compound (2-15-1). Particularly preferred compound (2) includes compound (2-1-1) to compound (2-8-1), compound (2-13-1) and compound (2-15-1). Preferred compound (3) includes compound (3-1-1) to compound (3-13-1). Further preferred compound (3) includes compound (3-1-1) to compound (3-7-1), and compound (3-9-1) to compound (3-13-1). Particularly preferred compound (3) includes compound (3-1-1), compound (3-3-1), compound (3-7-1) and compound (3-13-1).

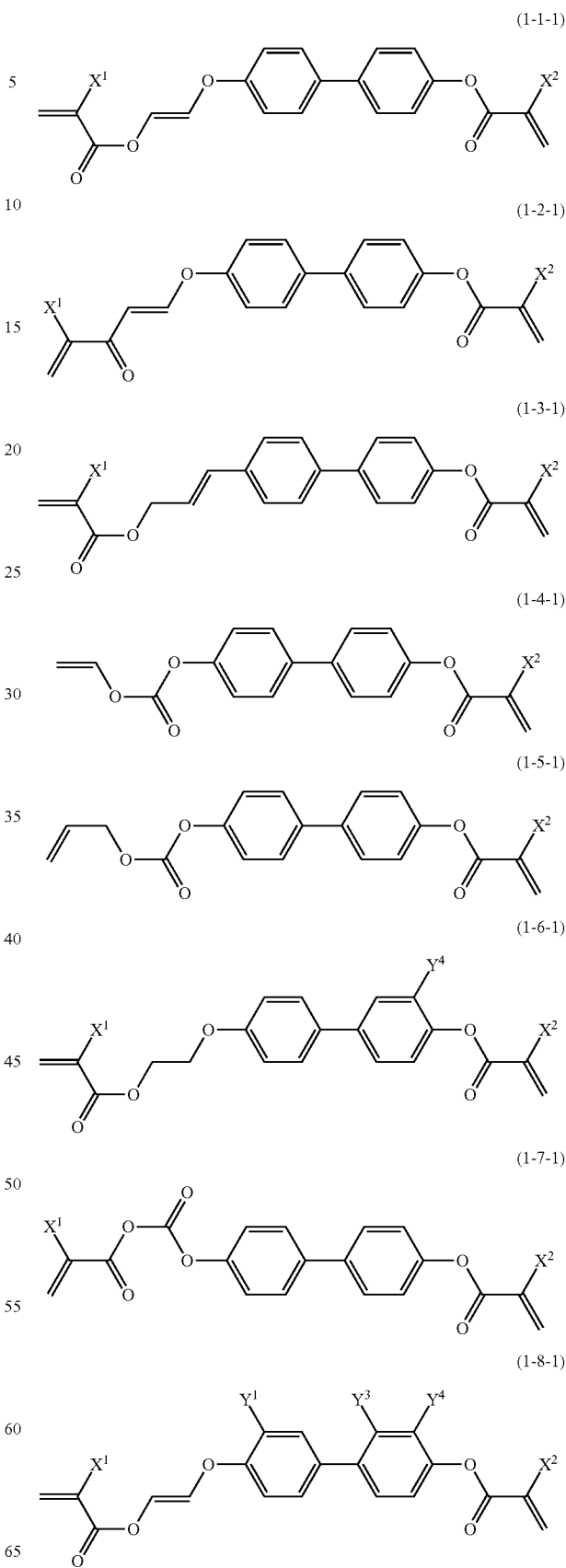

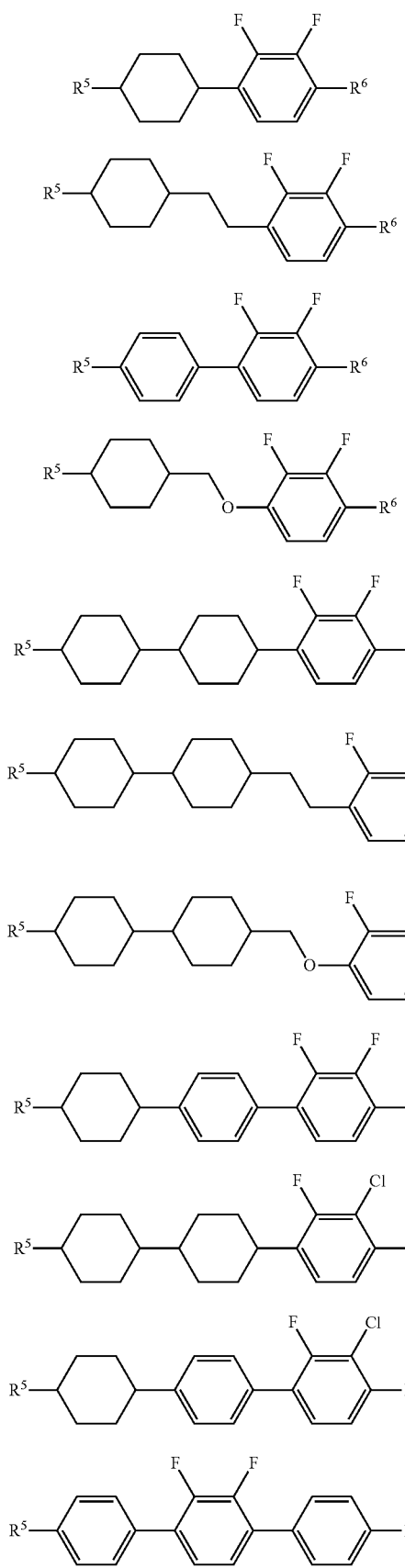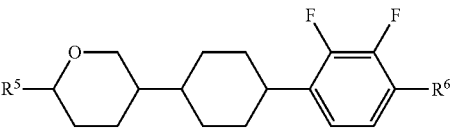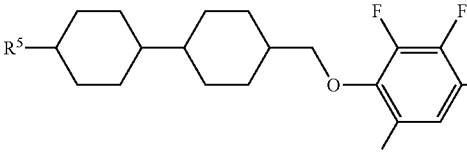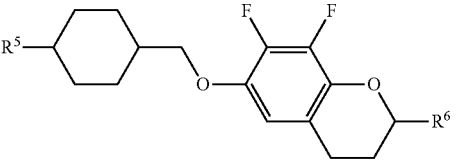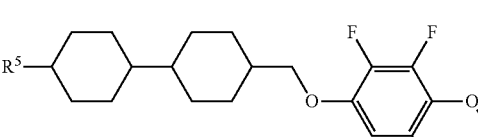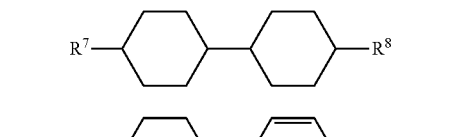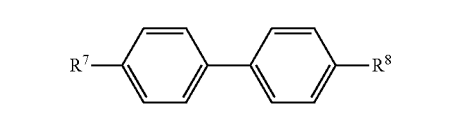

-continued (3-4-1)
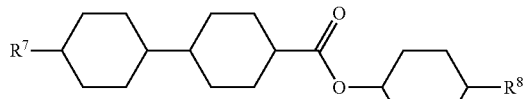

(3-5-1)
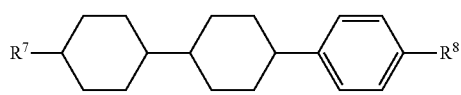

(3-6-1)

(3-7-1)
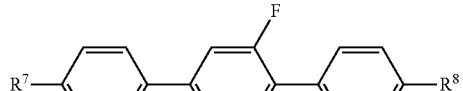

(3-8-1)

(3-9-1)
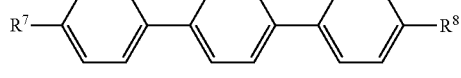

(3-10-1)
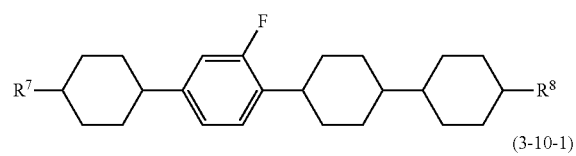

(3-11-1)
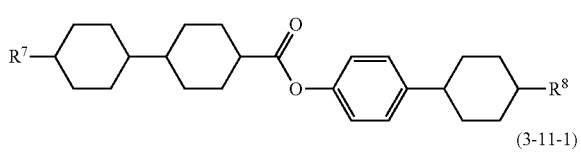

(3-12-1)
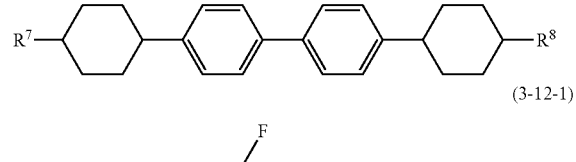

(3-13-1)
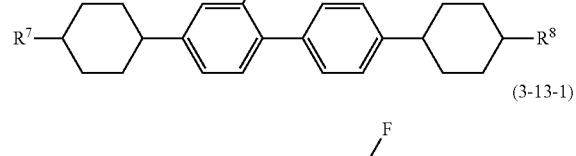

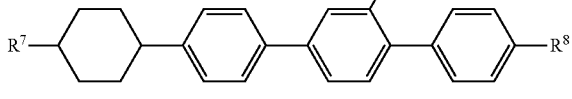

Sixth, the additive that may be mixed with the composition will be explained. Such an additive includes the optically active compound, the antioxidant, the ultraviolet light absorber, the dye, the antifoaming agent, the polymerization initiator and the polymerization inhibitor. The optically active compound is mixed with the composition for the purpose of inducing a helical structure in liquid crystals to give a twist angle. Examples of such a compound include compound (4-1) to compound (4-5). A preferred ratio of the optically active compound is approximately 5% by weight or less. A further preferred ratio is in the range of approximately 0.01% by weight to approximately 2% by weight.

(4-1)

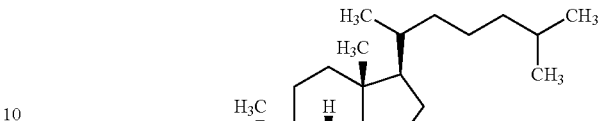

(4-2)
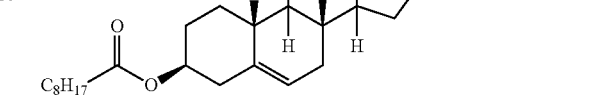

(4-3)
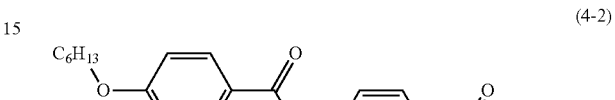

(4-4)
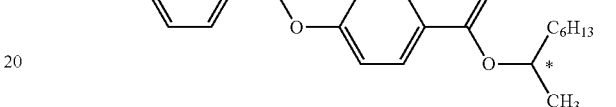

(4-5)

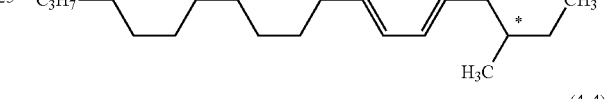

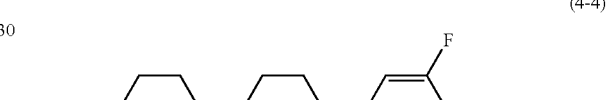

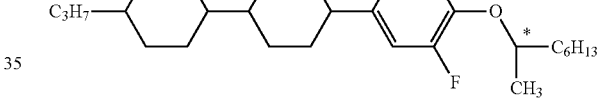

The antioxidant is mixed with the composition for the purpose of preventing a decrease in the specific resistance caused by heating in air, or maintaining a large voltage holding ratio at room temperature and also at a temperature close to the maximum temperature of the nematic phase even after the device has been used for a long period of time.

(5)
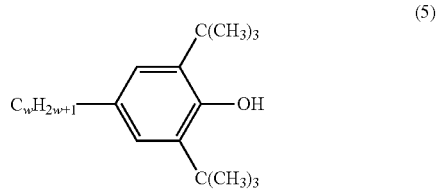

Preferred examples of the antioxidant include compound (5) where w is an integer from 1 to 9. In compound (5), preferred w is 1, 3, 5, 7 or 9. Further preferred w is 1 or 7. Compound (5) where w is 1 is effective in preventing a decrease in the specific resistance caused by heating in air because the compound (5) has a large volatility. Compound (5) where w is 7 is effective in maintaining a large voltage holding ratio at room temperature and also at a temperature close to the maximum temperature of the nematic phase even after the device has been used for a long period of time because the compound (5) has a small volatility. A preferred ratio of the antioxidant is approximately 50 ppm or more for achieving the effect thereof, and approximately 600 ppm or less for avoiding a decrease in the maximum temperature or avoiding an increase in the minimum temperature. A further preferred ratio is in the range of approximately 100 ppm to approximately 300 ppm.

Preferred examples of the ultraviolet light absorber include a benzophenone derivative, a benzoate derivative and a triazole derivative. A light stabilizer such as an amine having steric hindrance is also preferred. A preferred ratio of the ultraviolet light absorber or the stabilizer is approximately 50 ppm or more for achieving the effect thereof, and approximately 10,000 ppm or less for avoiding a decrease in the maximum temperature or avoiding an increase in the minimum temperature. A further preferred ratio is in the range of approximately 100 ppm to approximately 10,000 ppm.

A dichroic dye such as an azo dye or an anthraquinone dye is mixed with the composition to be adapted for a device having a guest host (GH) mode. A preferred ratio of the dye is in the range of approximately 0.01% by weight to approximately 10% by weight.

The antifoaming agent such as dimethyl silicone oil or methyl phenyl silicone oil is mixed with the composition for preventing foam formation. A preferred ratio of the antifoaming agent is approximately 1 ppm or more for achieving the effect thereof, and approximately 1,000 ppm or less for avoiding a poor display. A further preferred ratio is in the range of approximately 1 ppm to approximately 500 ppm.

The liquid crystal composition of the invention is suitable for use in the device having the polymer sustained alignment (PSA) mode because the composition contains the polymerizable compound. The composition may further contain a polymerizable compound other than compound (1). Preferred examples of the polymerizable compound include a compound having a polymerizable group, such as an acrylate, a methacrylate, a vinyl compound, a vinyloxy compound, a propenyl ether, an epoxy compound (oxirane, oxetane) and a vinyl ketone. Particularly preferred examples include an acrylate or methacrylate derivative. A preferred ratio of the polymerizable compound is approximately 0.03 part by weight or more for achieving the effect thereof, and approximately 10 parts by weight or less for avoiding a poor display, based on 100 parts by weight of the liquid crystal composition. A further preferred ratio is in the range of approximately 0.1 part by weight to approximately 2 parts by weight. A preferred ratio of compound (1) in the polymerizable compound is approximately 10% by weight or more. A further preferred ratio is approximately 30% by weight or more. The polymerizable compound is preferably polymerized by irradiation with ultraviolet light or the like in the presence of a suitable initiator such as a photopolymerization initiator. Suitable conditions for polymerization, suitable types of the initiator and suitable amounts thereof are known to those skilled in the art and are described in literatures. For example, Irgacure 651 (registered trademark; BASF), Irgacure 184 (registered trademark; BASF) or Darocure 1173 (registered trademark; BASF), each being a photoinitiator, is suitable for radical polymerization. A preferred ratio of the photopolymerization initiator is in the range of approximately 0.1% by weight to approximately 5% by weight, and a further preferred ratio is in the range of approximately 1% by weight to approximately 3% by weight, based on the polymerizable compound. A polymerized compound may be arranged through a process of arranging the liquid crystal composition containing the polymerizable compound between two substrates in the liquid crystal display device and polymerizing the polymerizable compound while applying a voltage between opposing electrode layers on the substrates, or a liquid crystal composition containing a preliminarily polymerized compound may be arranged between the two substrates in the liquid crystal display device.

Examples of the polymerizable compound that may be further contained, other than compound (1), include compound (6-1) to compound (6-9). The solubility in the composition can be increased and the reactivity can be enhanced by adding compound (1) in the polymerizable compound.

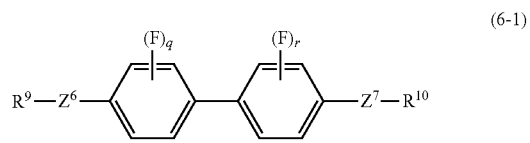

(6-1)

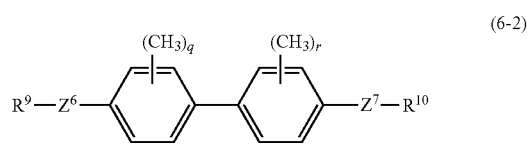

(6-2)

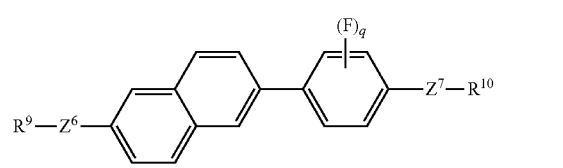

(6-3)

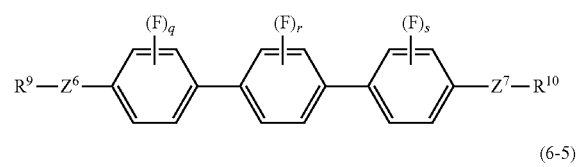

(6-4)

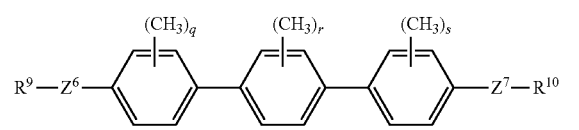

(6-5)

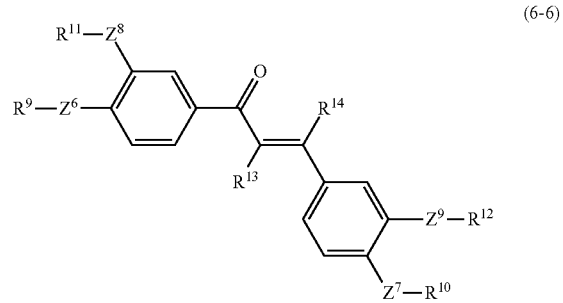

(6-6)

-continued

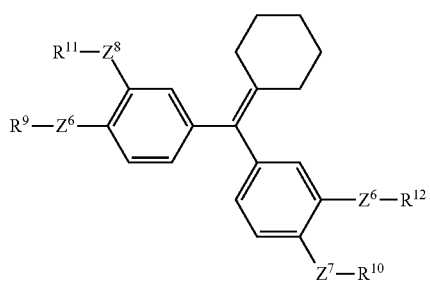

(6-7)

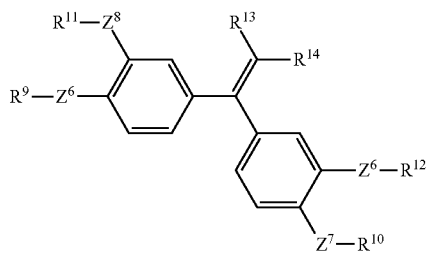

(6-8)

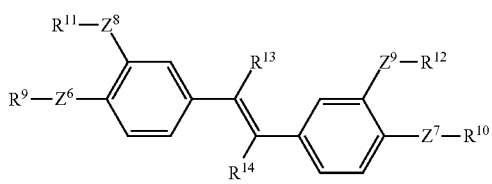

(6-9)

wherein $R^9$, $R^{10}$, $R^{11}$ and $R^{12}$ are independently acryloyl or methacryloyl, and $R^{13}$ and $R^{14}$ are independently hydrogen, halogen or alkyl having 1 to 10 carbons; $Z^6$ and $Z^7$ are simultaneously a single bond or alkylene having 1 to 12 carbons, and in the alkylene, at least one of —$CH_2$— may be replaced by —O—; $Z^8$ and $Z^9$ are independently a single bond or alkylene having 1 to 12 carbons, and in the alkylene, at least one of —$CH_2$— may be replaced by —O—; and q, r and s are independently 0, 1 or 2.

Seventh, the methods for synthesizing the component compounds will be explained. The component compounds can be prepared by suitably combining known techniques of synthetic organic chemistry as described in Organic Syntheses (John Wiley & Sons, Inc.), Organic Reactions (John Wiley & Sons, Inc.), Comprehensive Organic Synthesis (Pergamon Press) and New Experimental Chemistry Course (Shin Jikken Kagaku Koza in Japanese) (Maruzen Co., Ltd.) or the like.

The compounds can be prepared according to known methods. Examples of synthetic methods will be shown. Compound (2-1-1) and compound (2-5-1) are prepared by the method described in JP H2-503441 A (1990). Compound (3-1-1) and compound (3-5-1) are prepared by the method described in JP S59-176221 A (1984). The antioxidant is commercially available. A compound represented by formula (5) where w is 1 is available from Sigma-Aldrich Corporation. Compound (5) where w is 7 and so forth are prepared according to the method described in U.S. Pat. No. 3,660,505 B.

Any compounds whose synthetic methods are not described above can be prepared according to the methods described in books such as Organic Syntheses (John Wiley & Sons, Inc.), Organic Reactions (John Wiley & Sons, Inc.), Comprehensive Organic Synthesis (Pergamon Press) and New Experimental Chemistry Course (Shin Jikken Kagaku Koza in Japanese) (Maruzen Co., Ltd.). The composition is prepared according to publicly known methods using the thus obtained compounds. For example, the component compounds are mixed and dissolved in each other by heating.

Last, the application of the composition will be explained. Most of the compositions have a minimum temperature of approximately −10° C. or lower, a maximum temperature of approximately 70° C. or higher and an optical anisotropy in the range of approximately 0.07 to approximately 0.20. The device including the composition has a large voltage holding ratio. The composition is suitable for use in the AM device. The composition is particularly suitable for use in a transmissive AM device. A composition having an optical anisotropy in the range of approximately 0.08 to approximately 0.25 may be prepared by controlling the ratio of the component compounds or by mixing any other liquid crystal compound. The composition can be used as the composition having the nematic phase, and as the optically active composition by adding the optically active compound.

The composition can be used in the AM device. The composition can also be used in a PM device. The composition can be used in an AM device and a PM device both having a mode such as PC, TN, STN, ECB, OCB, IPS, VA or PSA. Use for in the AM device having the PSA mode is particularly preferred. The devices may be of a reflective type, a transmissive type or a transflective type. Use for in the transmissive device is preferred. The composition can also be used in an amorphous silicon-TFT device or a polycrystal silicon-TFT device. The composition can also be used in a nematic curvilinear aligned phase (NCAP) device prepared by microencapsulating the composition, and in a polymer dispersed (PD) device in which a three-dimensional network polymer is formed in the composition.

The liquid crystal display device of the invention is characterized by comprising two substrates including the electrode layer on at least one of the substrates, and arranging between the two substrates the liquid crystal composition of the invention or the liquid crystal composition containing the compound in which the polymerizable compound of the invention is polymerized. For example, the liquid crystal display device comprises two glass substrates referred to as an array substrate and a color filter substrate, and a thin film transistor (TFT), pixels, a coloring layer and so forth are formed on each of the glass substrates. An aluminosilicate glass or aluminoborosilicate glass is used for each of the glass substrates, for example. For the electrode layer, Indium-Tin Oxide and Indium-Zinc Oxide are generally used.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

In the following, the invention will be explained in detail byway of Examples, but the invention is not limited by the Examples.

A compound obtained by synthesis was identified by means of proton nuclear magnetic resonance spectroscopy ($^1$H-NMR), high performance liquid chromatography (HPLC), ultraviolet/visible spectroscopy (UV/Vis) and so forth. A melting point of the compound was determined by differential scanning calorimetry (DSC). First, each analytical method will be explained.

$^1$H-NMR Analysis:

As a measuring apparatus, DRX-500 (made by Bruker BioSpin Corporation) was used. A sample prepared in Examples and so forth was dissolved in a deuterated solvent such as $CDCl_3$ in which the sample was soluble, and measurement was carried out under the conditions of room temperature, 500 MHz, 24 times of accumulation and so forth. In the explanation of nuclear magnetic resonance spectra obtained, s, d, t, q and m stand for a singlet, a doublet, a triplet, a quartet, and a multiplet, respectively. Moreover, tetramethylsilane (TMS) was used as an internal standard for a zero point of chemical shifts (δ).

HPLC Analysis:

As a measuring apparatus, Prominence (LC-20AD; SPD-20A) made by Shimadzu Corporation was used. As a column, YMC-Pack ODS-A (length 150 mm, bore 4.6 mm, particle diameter 5 μm) made by YMC Co. Ltd. was used. As an effluent, acetonitrile/water (volume ratio: 80/20) was used, and a flow rate was adjusted to 1 mL/min. As a detector, an UV detector, a RI detector and a CORONA detector or the like was suitably used. When the UV detector was used, a detection wavelength was set at 254 nanometers.

A sample was dissolved in acetonitrile to prepare a solution of 0.1% by weight, and 1 microliter of the solution obtained was introduced into a sample injector.

As a recorder, C-R7Aplus made by Shimadzu Corporation was used. The chromatogram obtained shows a retention time of a peak and a value of each peak area corresponding to each component compound.

A ratio of peak areas in the chromatogram obtained from HPLC corresponds to a ratio of component compounds. In general, the weight percent of each component compound in an analytical sample is not completely identical with the percentage of each peak area in the analytical sample. When the columns described above are used in the invention, however, the weight percent of each component compound in the analytical sample corresponds substantially to the percentage of each peak area in the analytical sample because a correction coefficient is essentially 1 (one). The reason is that no significant difference exists among the correction coefficients of components in the liquid crystal compound. In order to more accurately determine a composition ratio of the liquid crystal compounds in the liquid crystal composition by the chromatogram, an internal standard method by the chromatogram is applied. Each component (test-component) of the liquid crystal compounds and a liquid crystal compound as a standard (standard reference material) as weighed accurately in a fixed amount are simultaneously analyzed by means of HPLC, and relative intensity of a ratio of a peak area of the test-component to a peak area of the standard reference material is calculated in advance. When corrected using the relative intensity of the peak area of each component to the peak area of the standard reference material, the composition ratio of the liquid crystal compounds in the liquid crystal composition can be more accurately determined from the chromatogram.

UV/Vis Analysis:

As a measuring apparatus, PharmaSpec UV-1700 made by Shimadzu Corporation was used. A detection wavelength was set to 190 nanometers to 700 nanometers.

A sample was dissolved in acetonitrile and prepared to be a 0.01 mmol/L solution, the solution was put in a quartz cell (optical path length 1 cm), and measurement was carried out.

DSC Measurement:

A sample was heated and then cooled at a rate of 3° C. per minute using a differential scanning calorimeter, DSC-7 System or Diamond DSC System, made by PerkinElmer, Inc. A starting point (on set) of an endothermic peak or an exothermic peak caused by a phase change of the sample was determined by extrapolation, and thus a melting point was determined.

Example 1

Comparison of Solubility in Liquid Crystal Composition 1

As a comparison, 1 part by weight of polymerizable compound (R-1) was added to 100 parts by weight of liquid crystal composition A, and dissolution was attempted at 25° C., but crystals remained in the liquid crystal composition and the compound did not wholly dissolved.

When 1 part by weight of polymerizable compound (1-1-1-1) of the invention was added to 100 parts by weight of liquid crystal composition A, and dissolution was attempted at 25° C., a whole amount of compound (1-1-1-1) was dissolved. The comparison shows that the compound of the invention is more easily dissolved in the liquid crystal composition. The results are shown in Table 3. In expressions in Table 3, "good" indicates no finding of crystals, and "bad" indicates finding of crystals. Components and ratios of liquid crystal composition A were as described below.

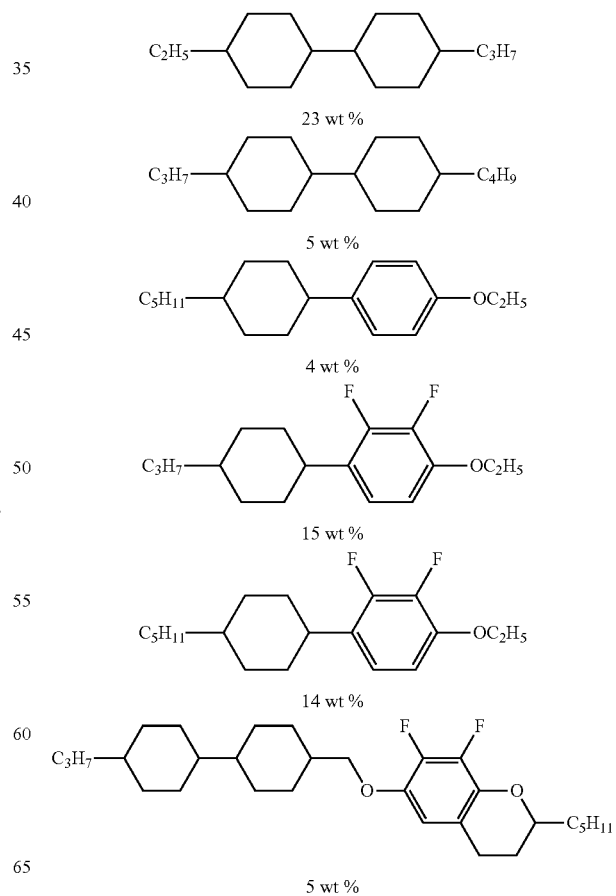

-continued

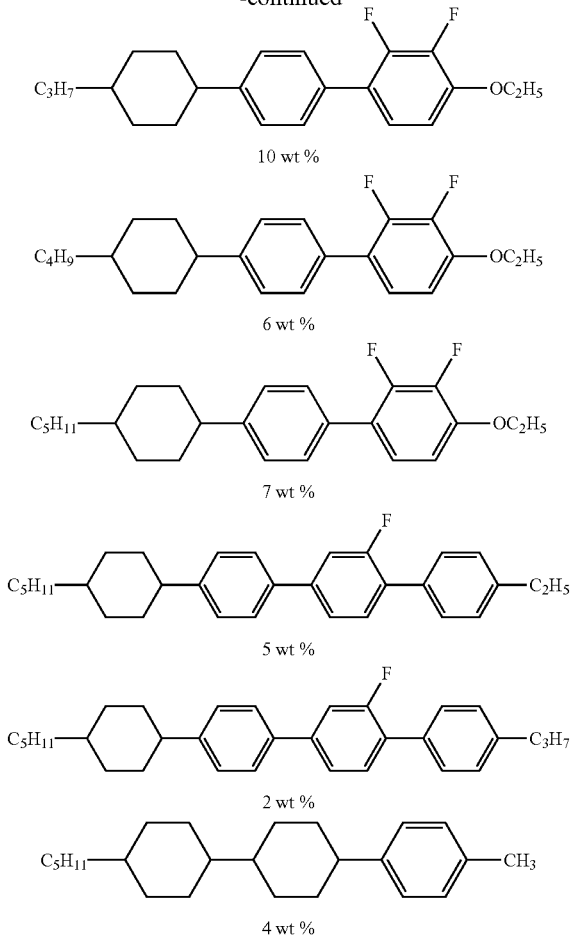

In order to evaluate characteristics of a composition and a compound to be contained in the composition, the composition and the compound were made a measurement object. When the measurement object was the composition, the composition was measured as a sample as is, and values obtained were described. When the measurement object was the compound, a sample for measurement was prepared by mixing the compound (15% by weight) with mother liquid crystals (85% by weight). Values of characteristics of the compound were calculated using values obtained by measurement, according to an extrapolation method: (extrapolated value)={(measured value of a sample for measurement)−0.85×(measured value of mother liquid crystals)}/0.15. When a smectic phase (or crystals) precipitated at the above ratio at 25° C., a ratio of the compound to the mother liquid crystals was changed step by step in the order of (10% by weight:90% by weight), (5% by weight:95% by weight) and (1% by weight:99% by weight). Values of a maximum temperature, an optical anisotropy, viscosity and a dielectric anisotropy with regard to the compound were determined according to the extrapolation method.

Components of the mother liquid crystals and ratios thereof were as described below.

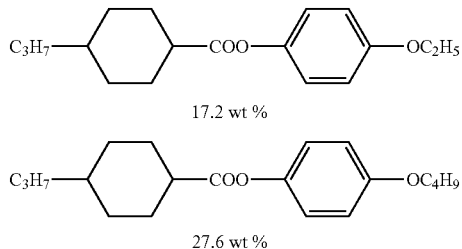

TABLE 3

Comparision of Solubility in Liquid Crystal Composition

| Formula No. | Structural Formula | Solubility (2 days, room temperature) |
|---|---|---|
| Comparative Example (R-1) | ![structure] | Bad |
| (1-1-1-1) | ![structure] | Good |

-continued

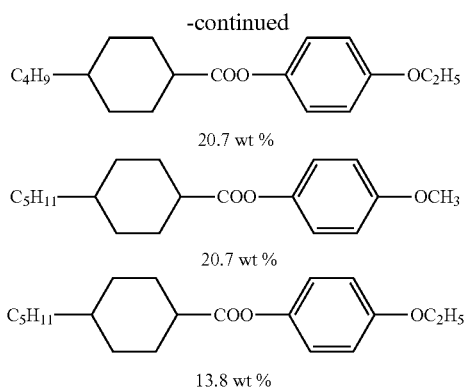

The characteristics were measured according to the methods described below. Most of the methods are applied as described in the Standard of Japan Electronics and Information Technology Industries Association, hereafter abbreviated as JEITA) discussed and established as the Standard of JEITA (JEITA ED-2521B), or as modified thereon.

Maximum Temperature of a Nematic Phase (NI; ° C.):

A sample was placed on a hot plate in a melting point apparatus equipped with a polarizing microscope and was heated at a rate of 1° C. per minute. Temperature when a part of the sample began to change from a nematic phase to an isotropic liquid was measured. A higher limit of a temperature range of the nematic phase may be abbreviated as "maximum temperature."

Minimum Temperature of a Nematic Phase ($T_c$; ° C.):

A sample having a nematic phase was put in glass vials and kept in freezers at temperatures of 0° C., −10° C., −20° C., −30° C. and −40° C. for 10 days, and then liquid crystal phases were observed. For example, when the sample maintained the nematic phase at −20° C. and changed to crystals or a smectic phase at −30° C., $T_c$ was expressed as $T_c$<−20° C. A lower limit of the temperature range of the nematic phase may be abbreviated as "minimum temperature."

Viscosity (Bulk Viscosity; η; Measured at 20° C.; mPa·s):

A cone-plate (E type) rotational viscometer was used for measurement.

Optical Anisotropy (Refractive Index Anisotropy; Δn; Measured at 25° C.):

Measurement was carried out by means of an Abbe refractometer with a polarizing plate mounted on an ocular, using light at a wavelength of 589 nanometers. A surface of a main prism was rubbed in one direction, and then a sample was added dropwise onto the main prism. A refractive index (n∥) was measured when the direction of polarized light was parallel to the direction of rubbing. A refractive index (n⊥) was measured when the direction of polarized light was perpendicular to the direction of rubbing. A value of optical anisotropy was calculated from an equation: Δn=n∥−n⊥.

Dielectric Anisotropy (Δ∈; Measured at 25° C.):

A value of dielectric anisotropy was calculated from an equation: Δ∈=∈∥−∈⊥. A dielectric constant (∈∥ and ∈⊥) was measured as described below.

(1) Measurement of dielectric constant (∈∥): An ethanol (20 mL) solution of octadecyl triethoxysilane (0.16 mL) was applied to a well-washed glass substrate. After rotating the glass substrate with a spinner, the glass substrate was heated at 150° C. for 1 hour. A sample was put in a VA device in which a distance (cell gap) between two glass substrates was 4 micrometers, and the device was sealed with an ultraviolet-curable adhesive. Sine waves (0.5 V, 1 kHz) were applied to the device, and after 2 seconds, a dielectric constant (∈∥) in the major axis direction of liquid crystal molecules was measured.

(2) Measurement of dielectric constant (∈⊥): A polyimide solution was applied to a well-washed glass substrate. After calcining the glass substrate, rubbing treatment was applied to the alignment film obtained. A sample was put in a TN device in which a distance (cell gap) between two glass substrates was 9 micrometers and a twist angle was 80 degrees. Sine waves (0.5 V, 1 kHz) were applied to the device, and after 2 seconds, a dielectric constant (∈⊥) in the minor axis direction of the liquid crystal molecules was measured.

Threshold Voltage (Vth; Measured at 25° C.; V):

An LCD-5100 luminance meter made by Otsuka Electronics Co., Ltd. was used for measurement. A light source was a halogen lamp. A sample was put in a normally black mode VA device in which a distance (cell gap) between two glass substrates was 4 micrometers and a rubbing direction was antiparallel, and the device was sealed with an ultraviolet-curable adhesive. A voltage (60 Hz, rectangular waves) to be applied to the device was stepwise increased from 0 V to 20 V at an increment of 0.02 V. On the occasion, the device was irradiated with light from a direction perpendicular to the device, and the amount of light transmitting the device was measured. A voltage-transmittance curve was prepared, in which the maximum amount of light corresponds to 100% transmittance and the minimum amount of light corresponds to 0% transmittance. A threshold voltage is voltage at 10% transmittance.

Voltage Holding Ratio (VHR-1; Measured at 25° C.; %):

A TN device used for measurement had a polyimide alignment film, and a distance (cell gap) between two glass substrates was 5 micrometers. A sample was put in the device, and then the device was sealed with an ultraviolet-curable adhesive. A pulse voltage (60 microseconds at 5 V) was applied to the TN device and the device was charged. A decaying voltage was measured for 16.7 milliseconds with a high-speed voltmeter, and area A between a voltage curve and a horizontal axis in a unit cycle was determined. Area B is an area without decay. A voltage holding ratio is a percentage of area A to area B.

Voltage Holding Ratio (VHR-2; Measured at 80° C.; %):

A TN device used for measurement had a polyimide alignment film, and a distance (cell gap) between two glass substrates was 5 micrometers. A sample was put in the device, and then the device was sealed with an ultraviolet-curable adhesive. A pulse voltage (60 microseconds at 5 V) was applied to the TN device and the device was charged. A decaying voltage was measured for 16.7 milliseconds with a high-speed voltmeter, and area A between a voltage curve and a horizontal axis in a unit cycle was determined. Area B is an area without decay. A voltage holding ratio is a percentage of area A to area B.

Voltage Holding Ratio (VHR-3; Measured at 25° C.; %):

Stability to ultraviolet light was evaluated by measuring a voltage holding ratio after a device was irradiated with ultraviolet light. A TN device used for measurement had a polyimide alignment film and a cell gap was 5 micrometers. A sample was injected into the device, and then the device was irradiated with light for 20 minutes. A light source was an ultra high-pressure mercury lamp USH-500D (made by Ushio, Inc.), and a distance between the device and the light source was 20 centimeters. In measuring VHR-3, a decaying voltage was measured for 16.7 milliseconds. A composition having a large VHR-3 has a large stability to ultraviolet light. A value of VHR-3 is preferably 90% or more, further preferably, 95% or more.

Voltage Holding Ratio (VHR-4; Measured at 25° C.; %):

A TN device into which a sample was injected was heated in a constant-temperature bath at 80° C. for 500 hours, and then stability to heat was evaluated by measuring a voltage holding ratio. In measuring VHR-4, a decaying voltage was measured for 16.7 milliseconds. A composition having a large VHR-4 has a large stability to heat.

Response Time (τ; Measured at 25° C.; ms):

An LCD-5100 luminance meter made by Otsuka Electronics Co., Ltd. was used for measurement. A light source was a halogen lamp. A low-pass filter was set at 5 kHz. A sample was put in a normally black mode PVA device in which a distance (cell gap) between two glass substrates was 3.2 micrometers and a rubbing direction was anti-parallel, and the device was sealed with an ultraviolet-curable adhesive. The device was irradiated with ultraviolet light of 25 mW/cm$^2$ (EXECURE4000-D lamp made by HOYA CANDEO OPTRONICS CORPORATION) for 400 seconds while applying a voltage of 15 V to the device. Rectangular waves (60 Hz, 10 V, 0.5 second) were applied to the device. On the occasion, the device was irradiated with light from a direction perpendicular to the device, and the amount of light transmitting the device was measured. The maximum amount of light corresponds to 100% transmittance, and the minimum amount of light corresponds to 0% transmittance. A response time is a period of time required for a change from 0% transmittance to 90% transmittance (rise time; millisecond).

Specific Resistance (ρ; Measured at 25° C.; Ωcm):

Into a vessel equipped with electrodes, 1.0 milliliter of a sample was injected. A DC voltage (10 V) was applied to the vessel, and a DC current after 10 seconds was measured. A specific resistance was calculated from the following equation: (specific resistance)={(voltage)×(electric capacity of a vessel)}/{(DC current)×(dielectric constant of vacuum)}.

Gas Chromatographic Analysis:

GC-14B Gas Chromatograph made by Shimadzu Corporation was used for measurement. A carrier gas was helium (2 mL per minute). A sample injector and a detector (FID) were set to 280° C. and 300° C., respectively. A capillary column DB-1 (length 30 m, bore 0.32 mm, film thickness 0.25 μm; dimethylpolysiloxane as a stationary phase, non-polar) made by Agilent Technologies, Inc. was used for separation of component compounds. After the column was kept at 200° C. for 2 minutes, the column was heated to 280° C. at a rate of 5° C. per minute. A sample was prepared in an acetone solution (0.1% by weight), and then 1 microliter of the solution was injected into the sample injector. A recorder was C-R5A Chromatopac made by Shimadzu Corporation or the equivalent thereof. The resulting gas chromatogram showed a retention time of a peak and a peak area corresponding to each of the component compounds.

As a solvent for diluting the sample, chloroform, hexane and so forth may also be used. The following capillary columns may also be used for separating the component compounds: HP-1 (length 30 m, bore 0.32 mm, film thickness 0.25 μm) made by Agilent Technologies, Inc., Rtx-1 (length 30 m, bore 0.32 mm, film thickness 0.25 μm) made by Restek Corporation and BP-1 (length 30 m, bore 0.32 mm, film thickness 0.25 μm) made by SGE International Pty. Ltd. A capillary column CBP1-M50-025 (length 50 m, bore 0.25 mm, film thickness 0.25 μm) made by Shimadzu Corporation may also be used for the purpose of avoiding an overlap of peaks of the compounds.

A ratio of liquid crystal compounds contained in the composition may be calculated by the method as described below. The liquid crystal compounds can be detected by means of a gas chromatograph. A ratio of peak areas in a gas chromatogram corresponds to a ratio (in the number of moles) of the liquid crystal compounds. When the capillary columns described above were used, a correction coefficient of each of the liquid crystal compounds may be regarded as 1 (one). Accordingly, a ratio (% by weight) of the liquid crystal compounds was calculated from the ratio of the peak areas.

The compounds in Comparative Examples and Examples were described using symbols according to definitions in Table 4 below. In Table 4, a configuration of 1,4-cyclohexylene is trans. A parenthesized number next to a symbolized compound in the Examples corresponds to the number of the compound. A symbol (–) means any other liquid crystal compound. A ratio (percentage) of the liquid crystal compounds is expressed in terms of weight percent (% by weight) based on the weight of the liquid crystal composition excluding the first composition. The liquid crystal composition further includes an impurity in addition thereto. Last, values of characteristics of the composition were summarized.

TABLE 4

| Method for Description of Compounds using Symbols —R—(A$_1$)—Z$_1$—.....—Z$_n$—(A$_n$)—R' | |
|---|---|
| 1) Left-terminal Group R— | Symbol |
| C$_n$H$_{2n+1}$— | n- |
| C$_n$H$_{2n+1}$O— | nO— |
| C$_m$H$_{2m+1}$OC$_n$H$_{2n}$— | mOn— |
| CH$_2$=CH— | V— |
| C$_n$H$_{2n+1}$—CH=CH— | nV— |
| CH$_2$=CH—C$_n$H$_{2n}$— | Vn— |
| C$_m$H$_{2m+1}$—CH=CH—C$_n$H$_{2n}$— | mVn— |
| CF$_2$=CH— | VFF— |
| CF$_2$=CH—C$_n$H$_{2n}$— | VFFn— |
| CH$_2$=CHCOO— | AC— |
| CH$_2$=C(CH$_3$)COO— | MAC— |
| CH$_2$=CHOCOO— | VCA— |
| CH$_2$=CHCH$_2$OCOO— | ACA— |
| 2) Right-terminal Group — | Symbol |
| —C$_n$H$_{2n+1}$ | -n |
| —OC$_n$H$_{2n+1}$ | —On |
| —CH=CH$_2$ | —V |
| —CH=CH—C$_n$H$_{2n+1}$ | —Vn |
| —C$_n$H$_{2n}$—CH=CH$_2$ | -nV |
| —CH=CF$_2$ | —VFF |
| —COOCH$_3$ | —EMe |
| —OCOCH=CH$_2$ | —AC |
| —OCOC(CH$_3$)=CH$_2$ | —MAC |
| 3) Bonding Group —Z$_n$— | Symbol |
| —C$_2$H$_4$— | 2 |
| —COO— | E |
| —CH=CH— | V |
| —CH=CH—O— | VO |
| —CF$_2$O— | X |
| —CH$_2$O— | 1O |
| —O— | O |
| 4) Ring Structure —A$_n$— | Symbol |
| 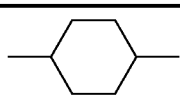 | H |
| 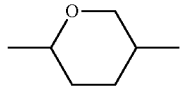 | Dh |

TABLE 4-continued

Method for Description of Compounds using Symbols
—R—(A₁)—Z₁—.....—Zₙ—(Aₙ)—R'

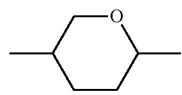 dh

 B

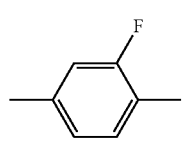 B(F)

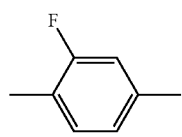 B(2F)

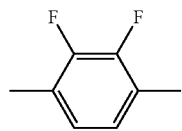 B(2F,3F)

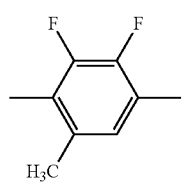 B(2F,3F,6Me)

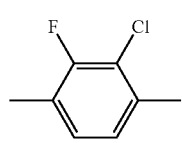 B(2F,3CL)

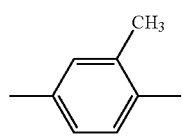 B(Me)

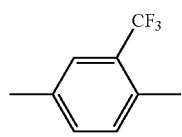 B(CF3)

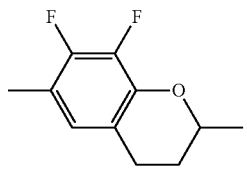 Cro(7F,8F)

TABLE 4-continued

Method for Description of Compounds using Symbols
—R—(A₁)—Z₁—.....—Zₙ—(Aₙ)—R'

5) Examples of Description

Example 1 MAC—VO—BB—MAC
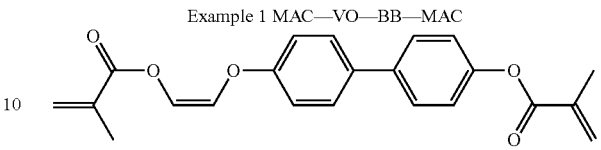

Example 2 ACA—BB—AC
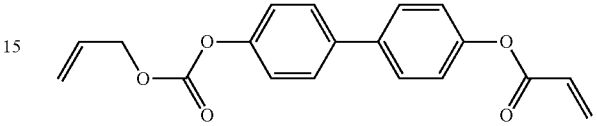

Example 3 3-HHB-1
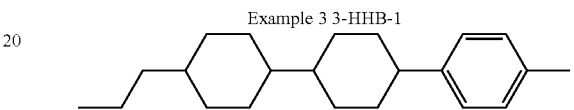

Example 4 MAC—BB—MAC
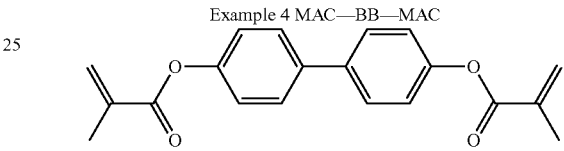

Comparative Example M1

The composition is a liquid crystal composition having a negative dielectric anisotropy without containing a first component of the invention. Components and characteristics of the composition were as described below.

| | | |
|---|---|---|
| V-HB(2F,3F)-O2 | (2-1-1) | 15% |
| V-HB(2F,3F)-O4 | (2-1-1) | 10% |
| 2-HBB(2F,3F)-O2 | (2-8-1) | 4% |
| 3-HBB(2F,3F)-O2 | (2-8-1) | 10% |
| 5-HBB(2F,3F)-O2 | (2-8-1) | 10% |
| 2-HHB(2F,3CL)-O2 | (2-9-1) | 2% |
| 3-HHB(2F,3CL)-O2 | (2-9-1) | 3% |
| 4-HHB(2F,3CL)-O2 | (2-9-1) | 3% |
| 5-HHB(2F,3CL)-O2 | (2-9-1) | 3% |
| 2-HH-3 | (3-1-1) | 27% |
| 3-HB-O2 | (3-2-1) | 2% |
| 3-HHB-1 | (3-5-1) | 3% |
| 3-HHB-3 | (3-5-1) | 5% |
| 3-HHB-O1 | (3-5-1) | 3% |

NI=73.8° C.; Tc<−20° C.; Δn=0.092; Δ∈=−3.1; Vth=2.11 V; τ=8.0 ms; VHR-1=99.1%; VHR-2=98.0%; VHR-3=98.0%.

Example M1

| | | |
|---|---|---|
| V-HB(2F,3F)-O2 | (2-1-1) | 15% |
| V-HB(2F,3F)-O4 | (2-1-1) | 10% |
| 2-HBB(2F,3F)-O2 | (2-8-1) | 4% |
| 3-HBB(2F,3F)-O2 | (2-8-1) | 10% |
| 5-HBB(2F,3F)-O2 | (2-8-1) | 10% |
| 2-HHB(2F,3CL)-O2 | (2-9-1) | 2% |
| 3-HHB(2F,3CL)-O2 | (2-9-1) | 3% |
| 4-HHB(2F,3CL)-O2 | (2-9-1) | 3% |

| | | |
|---|---|---|
| 5-HHB(2F,3CL)-O2 | (2-9-1) | 3% |
| 2-HH-3 | (3-1-1) | 27% |
| 3-HB-O2 | (3-2-1) | 2% |
| 3-HHB-1 | (3-5-1) | 3% |
| 3-HHB-3 | (3-5-1) | 5% |
| 3-HHB-O1 | (3-5-1) | 3% |

To 100 parts by weight of the composition, 0.3 part by weight of compound (1-1-1-1) as a first component of the invention was added.

| | |
|---|---|
| MAC-VO-BB-MAC | (1-1-1-1) |

Characteristics of the composition were as described below.

NI=74.3° C.; Tc<−20° C.; Δn=0.095; Δ∈=−3.1; Vth=2.13 V; VHR-1=99.2%; VHR-2=98.2%; VHR-3=98.3%.

Method for Preparation of a Liquid Crystal Display Device

An aligning agent was coated onto two glass substrates with ITO electrodes by means of a spinner, and a film was formed. After the coating, heating and drying were carried out at 80° C. for approximately 10 minutes, and heat treatment was carried out at 180° C. for 60 minutes, and thus an alignment film was formed. A gap material was sprayed onto one glass substrate, a peripheral was sealed with an epoxy adhesive with leaving an inlet of liquid crystals, and the substrates were laminated by internally placing a plane on which the alignment film was formed. A sample of Example M1 as a liquid crystal composition described herein was injected into the device in vacuum, the inlet was sealed with a photo-curing agent, and the photo-curing agent was irradiated with ultraviolet light, and thus cured. Subsequently, heat treatment was carried out at 110° C. for 30 minutes, and thus a liquid crystal display device was prepared. The device was irradiated with ultraviolet light of 25 mW/cm² for 400 seconds (EXECURE4000-D type made by HOYA CANDEO OPTRONICS, Inc.; mercury-xenon lamp) while applying a voltage of 15 V to the device, and thus a liquid crystal display device was finally prepared.

A response time of the liquid crystal device was as described below: τ=4.3 ms.

Example M2

| | | |
|---|---|---|
| 3-H2B(2F,3F)-O2 | (2-2-1) | 17% |
| 5-H2B(2F,3F)-O2 | (2-2-1) | 16% |
| 3-HHB(2F,3F)-O2 | (2-5-1) | 7% |
| 3-HBB(2F,3F)-O2 | (2-8-1) | 5% |
| 4-HBB(2F,3F)-O2 | (2-8-1) | 6% |
| 5-HBB(2F,3F)-O2 | (2-8-1) | 10% |
| 2-HH-3 | (3-1-1) | 20% |
| 3-HH-4 | (3-1-1) | 4% |
| 5-HB-O2 | (3-2-1) | 4% |
| 3-HHB-1 | (3-5-1) | 4% |
| 5-HBB(F)B-2 | (3-13-1) | 7% |

To 100 parts by weight of the composition, 0.3 part by weight of compound (1-1-1-1) as a first component of the invention was added.

| | |
|---|---|
| MAC-VO-BB-MAC | (1-1-1-1) |

Characteristics of the composition obtained were as described below.

NI=76.8° C.; Tc<−20° C.; Δn=0.099; Δ∈=−3.1; Vth=2.36 V; VHR-1=99.1%; VHR-2=98.5%; VHR-3=98.6%.

A response time of the liquid crystal display device prepared according to the method described in Example M1 was as described below: τ=4.6 ms.

Example M3

| | | |
|---|---|---|
| V-HB(2F,3F)-O2 | (2-1-1) | 11% |
| 3-H2B(2F,3F)-O2 | (2-2-1) | 15% |
| 5-H2B(2F,3F)-O2 | (2-2-1) | 5% |
| 3-BB(2F,3F)-O2 | (2-3-1) | 5% |
| 3-H1OB(2F,3F)-O2 | (2-4-1) | 5% |
| 3-HH2B(2F,3F)-O2 | (2-6-1) | 5% |
| 3-HBB(2F,3F)-O2 | (2-8-1) | 5% |
| 4-HBB(2F,3F)-O2 | (2-8-1) | 6% |
| 5-HBB(2F,3F)-O2 | (2-8-1) | 6% |
| 3-HH-4 | (3-1-1) | 10% |
| 1-BB-3 | (3-3-1) | 4% |
| 3-HHB-1 | (3-5-1) | 4% |
| 3-HHB-3 | (3-5-1) | 5% |
| 3-HHB-O1 | (3-5-1) | 3% |
| 5-HBB(F)B-2 | (3-13-1) | 6% |
| 5-HBB(F)B-3 | (3-13-1) | 5% |

To 100 parts by weight of the composition, 0.3 part by weight of compound (1-1-1-1) as a first component of the invention was added.

| | |
|---|---|
| MAC-VO-BB-MAC | (1-1-1-1) |

Characteristics of the composition obtained were as described below.

NI=85.3° C.; Tc<−20° C.; Δn=0.122; Δ∈=−3.8; Vth=2.15 V; VHR-1=99.2%; VHR-2=98.7%; VHR-3=98.6%.

A response time of the liquid crystal display device prepared according to the method described in Example M1 was as described below: τ=5.3 ms.

Example M4

| | | |
|---|---|---|
| V-HB(2F,3F)-O2 | (2-1-1) | 10% |
| V-HB(2F,3F)-O4 | (2-1-1) | 10% |
| 3-H1OB(2F,3F)-O2 | (2-4-1) | 6% |
| 3-HBB(2F,3F)-O2 | (2-8-1) | 10% |
| 5-HBB(2F,3F)-O2 | (2-8-1) | 8% |
| 3-dhHB(2F,3F)-O2 | (2-14-1) | 3% |
| 3-HH1OCro(7F,8F)-5 | (2-19-1) | 5% |
| 2-HH-5 | (3-1-1) | 8% |
| 3-HH-4 | (3-1-1) | 14% |
| 5-HB-O2 | (3-2-1) | 8% |
| 3-HHB-1 | (3-5-1) | 3% |
| 3-HHB-O1 | (3-5-1) | 2% |
| 5-HBB-2 | (3-6-1) | 4% |
| 3-HHEBH-3 | (3-10-1) | 2% |
| 3-HHEBH-5 | (3-10-1) | 2% |
| 3-HBBH-5 | (3-11-1) | 3% |
| 5-HBB(F)B-2 | (3-13-1) | 2% |

To 100 parts by weight of the composition, 0.3 part by weight of compound (1-1-1-1) as a first component of the invention was added.

| | |
|---|---|
| MAC-VO-BB-MAC | (1-1-1-1) |

Characteristics of the composition obtained were as described below.

NI=89.9° C.; Tc<−20° C.; Δn=0.100; Δ∈=−3.0; Vth=2.30 V; VHR-1=99.2%; VHR-2=98.6%; VHR-3=98.8%.

A response time of the liquid crystal display device prepared according to the method described in Example M1 was as described below: τ=5.3 ms.

Example M5

| V-HB(2F,3F)-O2 | (2-1-1) | 10% |
|---|---|---|
| 3-H2B(2F,3F)-O2 | (2-2-1) | 13% |
| 5-H2B(2F,3F)-O2 | (2-2-1) | 12% |
| 5-BB(2F,3F)-O2 | (2-3-1) | 5% |
| 5-H1OB(2F,3F)-O2 | (2-4-1) | 5% |
| 5-HH1OB(2F,3F)-O2 | (2-7-1) | 6% |
| 5-HBB(2F,3F)-O2 | (2-8-1) | 9% |
| 3-HHB(2F,3CL)-O2 | (2-9-1) | 4% |
| 3-HH-4 | (3-1-1) | 2% |
| 5-HH-V | (3-1-1) | 5% |
| 3-HHEH-3 | (3-4-1) | 2% |
| 3-HHEH-5 | (3-4-1) | 2% |
| 4-HHEH-3 | (3-4-1) | 2% |
| 4-HHEH-5 | (3-4-1) | 2% |
| 3-HHB-1 | (3-5-1) | 4% |
| 3-HHB-3 | (3-5-1) | 7% |
| 3-HHB-O1 | (3-5-1) | 4% |
| 3-HHEBH-3 | (3-10-1) | 3% |
| 3-HHEBH-5 | (3-10-1) | 3% |

To 100 parts by weight of the composition, 0.3 part by weight of compound (1-2-1-1) as a first component of the invention was added.

| MAC-V-BB-MAC | (1-2-1-1) |
|---|---|

Characteristics of the composition obtained were as described below.

NI=89.5° C.; Tc<−20° C.; Δn=0.095; Δ∈=−4.3; Vth=2.05 V; VHR-1=99.1%; VHR-2=98.2%; VHR-3=98.6%.

A response time of the liquid crystal display device prepared according to the method described in Example M1 was as described below: τ=5.5 ms.

Example M6

| V-HB(2F,3F)-O2 | (2-1-1) | 11% |
|---|---|---|
| 3-H2B(2F,3F)-O2 | (2-2-1) | 5% |
| 3-HH1OB(2F,3F)-O2 | (2-7-1) | 5% |
| 4-HBB(2F,3F)-O2 | (2-8-1) | 4% |
| 5-HBB(2F,3F)-O2 | (2-8-1) | 7% |
| 3-HDhB(2F,3F)-O2 | (2-13-1) | 5% |
| 3-dhBB(2F,3F)-O2 | (2-15-1) | 6% |
| 3-HH1OCro(7F,8F)-5 | (2-19-1) | 8% |
| 2-HH-3 | (3-1-1) | 17% |
| 3-HH-5 | (3-1-1) | 4% |
| 5-HB-O2 | (3-2-1) | 6% |
| 1-BB-3 | (3-3-1) | 5% |
| 3-HHB-1 | (3-5-1) | 5% |
| 3-HHB-3 | (3-5-1) | 6% |
| 3-HHB-O1 | (3-5-1) | 3% |
| 3-B(F)BB-2 | (3-8-1) | 3% |

To 100 parts by weight of the composition, 0.3 part by weight of compound (1-6-1-1) as a first component of the invention was added.

| MAC-2O-BB(CF3)-MAC | (1-6-1-1) |
|---|---|

Characteristics of the composition obtained were as described below.

NI=84.5° C.; Tc<−20° C.; Δn=0.103; Δ∈=−3.1; Vth=2.22 V; VHR-1=99.3%; VHR-2=98.5%; VHR-3=98.5%.

A response time of the liquid crystal display device prepared according to the method described in Example M1 was as described below: τ=4.5 ms.

Example M7

| V-HB(2F,3F)-O2 | (2-1-1) | 10% |
|---|---|---|
| 3-H2B(2F,3F)-O2 | (2-2-1) | 5% |
| 3-BB(2F,3F)-O2 | (2-3-1) | 5% |
| 3-H1OB(2F,3F)-O2 | (2-4-1) | 6% |
| 3-HBB(2F,3F)-O2 | (2-8-1) | 6% |
| 3-HHB(2F,3CL)-O2 | (2-9-1) | 3% |
| 3-DhHB(2F,3F)-O2 | (2-12-1) | 3% |
| 3-HDhB(2F,3F)-O2 | (2-13-1) | 3% |
| 3-HH1OCro(7F,8F)-5 | (2-19-1) | 5% |
| 2-HH-3 | (3-1-1) | 19% |
| 5-HB-O2 | (3-2-1) | 5% |
| V2-BB-1 | (3-3-1) | 3% |
| 3-HHB-1 | (3-5-1) | 4% |
| 3-HHB-3 | (3-5-1) | 7% |
| 3-HHB-O1 | (3-5-1) | 4% |
| 2-BB(F)B-3 | (3-7-1) | 4% |
| 3-HB(F)BH-3 | (3-12-1) | 3% |
| 5-HBB(F)B-2 | (3-13-1) | 5% |

To 100 parts by weight of the composition, 0.3 part by weight of compound (1-5-1-1) as a first component of the invention was added.

| ACA-BB-AC | (1-5-1-1) |
|---|---|

Characteristics of the composition obtained were as described below.

NI=83.3° C.; Tc<−20° C.; Δn=0.111; Δ∈=−2.6; Vth=2.32 V; VHR-1=99.1%; VHR-2=98.5%; VHR-3=98.5%.

A response time of the liquid crystal display device prepared according to the method described in Example M1 was as described below: τ=4.1 ms.

Example M8

| V-HB(2F,3F)-O2 | (2-1-1) | 14% |
|---|---|---|
| 5-H2B(2F,3F)-O2 | (2-2-1) | 5% |
| 3-HBB(2F,3F)-O2 | (2-8-1) | 10% |
| 4-HBB(2F,3F)-O2 | (2-8-1) | 4% |
| 5-HBB(2F,3F)-O2 | (2-8-1) | 5% |
| 3-HH1OCro(7F,8F)-5 | (2-19-1) | 7% |
| 2-HH-3 | (3-1-1) | 23% |
| 3-HH-O1 | (3-1-1) | 5% |
| 3-HH-V | (3-1-1) | 3% |
| 4-HHEH-3 | (3-4-1) | 3% |
| 4-HHEH-5 | (3-4-1) | 3% |
| 3-HHB-1 | (3-5-1) | 6% |
| 3-HHB-3 | (3-5-1) | 6% |
| 3-HHB-O1 | (3-5-1) | 3% |
| 2-BB(F)B-5 | (3-7-1) | 3% |

To 100 parts by weight of the composition, 0.3 part by weight of compound (1-5-1-2) as a first component of the invention was added.

| ACA-BB-MAC | (1-5-1-2) |
|---|---|

Characteristics of the composition obtained were as described below.

NI=83.2° C.; Tc<−20° C.; Δn=0.093; Δ∈=−2.6; Vth=2.25 V; VHR-1=99.3%; VHR-2=98.7%; VHR-3=98.6%.

A response time of the liquid crystal display device prepared according to the method described in Example M1 was as described below: τ=4.1 ms.

Example M9

| 3-H2B(2F,3F)-O2 | (2-2-1) | 15% |
|---|---|---|
| 5-H2B(2F,3F)-O2 | (2-2-1) | 15% |
| 2-HBB(2F,3F)-O2 | (2-8-1) | 3% |
| 3-HBB(2F,3F)-O2 | (2-8-1) | 9% |
| 5-HBB(2F,3F)-O2 | (2-8-1) | 9% |
| 3-HHB(2F,3CL)-O2 | (2-9-1) | 5% |
| 2-HH-5 | (3-1-1) | 4% |
| 3-HH-4 | (3-1-1) | 15% |
| 3-HH-V1 | (3-1-1) | 4% |
| 3-HB-O2 | (3-2-1) | 12% |
| 3-HHB-3 | (3-5-1) | 6% |
| 3-HB(F)HH-2 | (3-9-1) | 3% |

To 100 parts by weight of the composition, 0.3 part by weight of compound (1-1-1-1) as a first component of the invention was added.

| MAC-VO-BB-MAC | (1-1-1-1) |
|---|---|

Characteristics of the composition obtained were as described below.

NI=75.2° C.; Tc<−20° C.; Δn=0.096; Δ∈=−2.7; Vth=2.41 V; VHR-1=99.2%; VHR-2=98.5%; VHR-3=98.5%.

A response time of the liquid crystal display device prepared according to the method described in Example M1 was as described below: τ=4.5 ms.

Example M10

| 3-H2B(2F,3F)-O2 | (2-2-1) | 17% |
|---|---|---|
| 5-H2B(2F,3F)-O2 | (2-2-1) | 17% |
| 3-HH1OB(2F,3F)-O2 | (2-7-1) | 5% |
| 3-HHB(2F,3CL)-O2 | (2-9-1) | 4% |
| 4-HHB(2F,3CL)-O2 | (2-9-1) | 3% |
| 5-HHB(2F,3CL)-O2 | (2-9-1) | 3% |
| 3-HBB(2F,3CL)-O2 | (2-10-1) | 8% |
| 2-BB(2F,3F)B-3 | (2-11-1) | 4% |
| 3-HH-V | (3-1-1) | 27% |
| V-HHB-1 | (3-5-1) | 7% |
| 2-BB(F)B-3 | (3-7-1) | 2% |
| 3-HHEBH-3 | (3-10-1) | 3% |

To 100 parts by weight of the composition, 0.3 part by weight of compound (1-2-1-1) as a first component of the invention was added.

| MAC-V-BB-MAC | (1-2-1-1) |
|---|---|

Characteristics of the composition obtained were as described below.

NI=71.9° C.; Tc<−20° C.; Δn=0.093; Δ∈=−2.8; Vth=2.33 V; VHR-1=99.2%; VHR-2=98.6%; VHR-3=98.6%.

A response time of the liquid crystal display device prepared according to the method described in Example M1 was as described below: τ=3.8 ms.

Example M11

| V-HB(2F,3F)-O2 | (2-1-1) | 15% |
|---|---|---|
| V-HB(2F,3F)-O4 | (2-1-1) | 7% |
| 3-HBB(2F,3F)-O2 | (2-8-1) | 3% |
| V-HBB(2F,3F)-O2 | (2-8-1) | 10% |
| V2-HBB(2F,3F)-O2 | (2-8-1) | 10% |
| 3-HH1OCro(7F,8F)-5 | (2-19-1) | 8% |
| 2-HH-3 | (3-1-1) | 29% |
| 3-HHB-1 | (3-5-1) | 6% |
| 3-HHB-3 | (3-5-1) | 6% |
| 3-HHB-O1 | (3-5-1) | 6% |

To 100 parts by weight of the composition, 0.3 part by weight of compound (1-1-1-1) as a first component of the invention was added.

| MAC-VO-BB-MAC | (1-1-1-1) |
|---|---|

Characteristics of the composition obtained were as described below.

NI=80.9° C.; Tc<−20° C.; Δn=0.094; Δ∈=−3.1; Vth=2.26 V; VHR-1=99.3%; VHR-2=98.5%; VHR-3=98.6%.

A response time of the liquid crystal display device prepared according to the method described in Example M1 was as described below: τ=4.7 ms.

Example M12

| 5-BB(2F,3F)-O2 | (2-3-1) | 7% |
|---|---|---|
| 5-H1OB(2F,3F)-O2 | (2-4-1) | 10% |
| 4-HH1OB(2F,3F)-O2 | (2-7-1) | 5% |
| 5-HH1OB(2F,3F)-O2 | (2-7-1) | 5% |
| 5-HBB(2F,3CL)-O2 | (2-10-1) | 6% |
| 2-BB(2F,3F)B-3 | (2-11-1) | 3% |
| 3-DhHB(2F,3F)-O2 | (2-12-1) | 6% |
| 3-HDhB(2F,3F)-O2 | (2-13-1) | 7% |
| 3-HH-V | (3-1-1) | 30% |
| 3-HH-V1 | (3-1-1) | 6% |
| 3-HHB-1 | (3-5-1) | 4% |
| 3-HHB-O1 | (3-5-1) | 4% |
| 3-B(F)BB-2 | (3-8-1) | 3% |
| 1O1-HBBH-5 | (—) | 4% |

To 100 parts by weight of the composition, 0.3 part by weight of compound (1-1-1-1) as a first component of the invention was added.

| MAC-VO-BB-MAC | (1-1-1-1) |
|---|---|

Characteristics of the composition obtained were as described below.

NI=90.8° C.; Tc<−20° C.; Δn=0.099; Δ∈=−2.6; VHR-1=99.1%; VHR-2=98.1%; VHR-3=98.3%.

A response time of the liquid crystal display device prepared according to the method described in Example M1 was as described below: τ=4.1 ms.

Example M13

| | | |
|---|---|---|
| 3-H2B(2F,3F)-O2 | (2-2-1) | 12% |
| 3-HH2B(2F,3F)-O2 | (2-6-1) | 5% |
| 2-BBB(2F,3F)-O2 | (2-8-1) | 5% |
| 3-HBB(2F,3F)-O2 | (2-8-1) | 7% |
| 5-HBB(2F,3F)-O2 | (2-8-1) | 4% |
| 3-HH2B(2F,3F,6Me)-O2 | (2-16-1) | 5% |
| 3-HH1OB(2F,3F,6Me)-O2 | (2-17-1) | 6% |
| 3-HH1OCro(7F,8F)-5 | (2-19-1) | 4% |
| 4-HH-V | (3-1-1) | 15% |
| 5-HH-V | (3-1-1) | 23% |
| 3-HH-V1 | (3-1-1) | 6% |
| V-HHB-1 | (3-5-1) | 5% |
| V2-HHB-1 | (3-5-1) | 3% |

To 100 parts by weight of the composition, 0.3 part by weight of compound (1-1-1-1) as a first component of the invention was added.

| | |
|---|---|
| MAC-VO-BB-MAC | (1-1-1-1) |

Characteristics of the composition obtained were as described below.

NI=88.5° C.; Tc<−20° C.; Δn=0.092; Δ∈=−2.9; VHR-1=99.4%; VHR-2=98.5%; VHR-3=98.7%.

A response time of the liquid crystal display device prepared according to the method described in Example M1 was as described below: τ=4.7 ms.

Example M14

| | | |
|---|---|---|
| 3-HB(2F,3F)-O2 | (2-1-1) | 8% |
| 3-HHB(2F,3F)-O2 | (2-5-1) | 10% |
| 3-HBB(2F,3F)-O2 | (2-8-1) | 7% |
| 5-HBB(2F,3F)-O2 | (2-8-1) | 5% |
| 3-dhBB(2F,3F)-O2 | (2-15-1) | 6% |
| 3-HH1OB(2F,3F,6Me)-O2 | (2-17-1) | 6% |
| 3-H1OCro(7F,8F)-5 | (2-18-1) | 5% |
| 3-HH-V | (3-1-1) | 40% |
| 1-HH-2V1 | (3-1-1) | 6% |
| 3-HHEBH-3 | (3-10-1) | 4% |
| 3-HHEBH-4 | (3-10-1) | 3% |

To 100 parts by weight of the composition, 0.3 part by weight of compound (1-2-1-1) as a first component of the invention was added.

| | |
|---|---|
| MAC-V-BB-MAC | (1-2-1-1) |

Characteristics of the composition obtained were as described below.

NI=84.7° C.; Tc<−20° C.; Δn=0.090; Δ∈=−3.1; VHR-1=99.1%; VHR-2=98.6%; VHR-3=98.6%.

A response time of the liquid crystal display device prepared according to the method described in Example M1 was as described below: τ=4.0 ms.

Example M15

| | | |
|---|---|---|
| V-HB(2F,3F)-O2 | (2-1-1) | 12% |
| V-HB(2F,3F)-O4 | (2-1-1) | 5% |
| 3-H2B(2F,3F)-O2 | (2-2-1) | 15% |
| 3-BB(2F,3F)-O2 | (2-3-1) | 4% |
| 3-HBB(2F,3F)-O2 | (2-8-1) | 7% |
| 4-HBB(2F,3F)-O2 | (2-8-1) | 6% |
| 5-HBB(2F,3F)-O2 | (2-8-1) | 6% |
| 2-BB(2F,3F)B-4 | (2-11-1) | 3% |
| 2-HH-5 | (3-1-1) | 5% |
| 3-HH-4 | (3-1-1) | 14% |
| 3-HHB-1 | (3-5-1) | 4% |
| 3-HHB-3 | (3-5-1) | 5% |
| 3-HHB-O1 | (3-5-1) | 3% |
| 5-HBB(F)B-2 | (3-13-1) | 6% |
| 1O1-HBBH-5 | (—) | 5% |

To 100 parts by weight of the composition, 0.3 part by weight of compound (1-2-1-1) as a first component of the invention was added.

| | |
|---|---|
| MAC-V-BB-MAC | (1-2-1-1) |

Characteristics of the composition obtained were as described below.

NI=88.7° C.; Tc<−20° C.; Δn=0.115; Δ∈=−3.3; VHR-1=99.2%; VHR-2=98.5%; VHR-3=98.6%.

A response time of the liquid crystal display device prepared according to the method described in Example M1 was as described below: τ=4.9 ms.

Example M16

| | | |
|---|---|---|
| 3-HB(2F,3F)-O2 | (2-1-1) | 5% |
| 3-H2B(2F,3F)-O2 | (2-2-1) | 19% |
| 5-H2B(2F,3F)-O2 | (2-2-1) | 5% |
| 3-HHB(2F,3F)-O2 | (2-5-1) | 8% |
| 5-HHB(2F,3F)-O2 | (2-5-1) | 7% |
| 3-HBB(2F,3F)-O2 | (2-8-1) | 10% |
| 4-HBB(2F,3F)-O2 | (2-8-1) | 5% |
| 3-HDhB(2F,3F)-O2 | (2-13-1) | 5% |
| 2-HH-3 | (3-1-1) | 20% |
| 3-HH-4 | (3-1-1) | 7% |
| 3-HHB-1 | (3-5-1) | 4% |
| V-HHB-1 | (3-5-1) | 3% |
| 5-B(F)BB-2 | (3-8-1) | 2% |

To 100 parts by weight of the composition, 0.15 part by weight of compound (1-1-1-1) as a first component of the invention, and 0.15 part by weight of polymerizable compound (6-1-1) that is not the first component of the invention were added.

| | |
|---|---|
| MAC-VO-BB-MAC | (1-1-1-1) |
| MAC-BB-MAC | (6-1-1) |

Characteristics of the composition obtained were as described below.

NI=78.8° C.; Tc<−20° C.; Δn=0.090; Δ∈=−3.5; VHR-1=99.1%; VHR-2=98.3%; VHR-3=98.4%.

A response time of the liquid crystal display device prepared according to the method described in Example M1 was as described below: τ=4.2 ms.

Example M17

| V-HB(2F,3F)-O2 | (2-1-1) | 5% |
|---|---|---|
| 3-H2B(2F,3F)-O2 | (2-2-1) | 10% |
| 5-H2B(2F,3F)-O2 | (2-2-1) | 10% |
| 3-HHB(2F,3F)-O2 | (2-5-1) | 8% |
| 5-HHB(2F,3F)-O2 | (2-5-1) | 6% |
| 3-HH1OB(2F,3F)-O2 | (2-7-1) | 5% |
| 3-HBB(2F,3F)-O2 | (2-8-1) | 10% |
| 4-HBB(2F,3F)-O2 | (2-8-1) | 5% |
| 3-HDhB(2F,3F)-O2 | (2-13-1) | 5% |
| 2-HH-3 | (3-1-1) | 20% |
| 3-HH-4 | (3-1-1) | 7% |
| 3-HHB-1 | (3-5-1) | 4% |
| 3-HHB-3 | (3-5-1) | 3% |
| 5-B(F)BB-2 | (3-8-1) | 2% |

To 100 parts by weight of the composition, 0.15 part by weight of compound (1-1-1-1) as a first component of the invention, and 0.15 part by weight of polymerizable compound (6-1-2) that is not the first component of the invention were added.

| MAC-VO-BB-MAC | (1-1-1-1) |
|---|---|
| MAC-B(2F)B-MAC | (6-1-2) |

Characteristics of the composition obtained were as described below.
NI=83.7° C.; Tc<−20° C.; Δn=0.090; Δ∈=−3.6; VHR-1=99.2%; VHR-2=98.3%; VHR-3=98.6%.
A response time of the liquid crystal display device prepared according to the method described in Example M1 was as described below: τ=4.4 ms.

Example M18

| 3-H2B(2F,3F)-O2 | (2-2-1) | 19% |
|---|---|---|
| 5-H2B(2F,3F)-O2 | (2-2-1) | 10% |
| 3-HHB(2F,3F)-O2 | (2-5-1) | 8% |
| 5-HHB(2F,3F)-O2 | (2-5-1) | 5% |
| 3-HBB(2F,3F)-O2 | (2-8-1) | 10% |
| 4-HBB(2F,3F)-O2 | (2-8-1) | 5% |
| 3-dhBB(2F,3F)-O2 | (2-15-1) | 5% |
| 2-HH-3 | (3-1-1) | 20% |
| 2-HH-5 | (3-1-1) | 5% |
| 3-HHB-1 | (3-5-1) | 5% |
| 3-HHB-3 | (3-5-1) | 3% |
| 5-B(F)BB-2 | (3-8-1) | 5% |

To 100 parts by weight of the composition, 0.15 part by weight of compound (1-1-1-1) and 0.15 part by weight of compound (1-1-1-2) both as a first component of the invention were added.

| MAC-VO-BB-MAC | (1-1-1-1) |
|---|---|
| MAC-VO-BB-AC | (1-1-1-2) |

Characteristics of the composition obtained were as described below.
NI=81.1° C.; Tc<−20° C.; Δn=0.100; Δ∈=−3.4; VHR-1=99.2%; VHR-2=98.5%; VHR-3=98.6%.
A response time of the liquid crystal display device prepared according to the method described in Example M1 was as described below: τ=4.4 ms.

Example M19

| 3-H2B(2F,3F)-O2 | (2-2-1) | 10% |
|---|---|---|
| 5-H2B(2F,3F)-O2 | (2-2-1) | 10% |
| 3-BB(2F,3F)-O2 | (2-3-1) | 5% |
| 3-HHB(2F,3F)-O2 | (2-5-1) | 8% |
| 5-HHB(2F,3F)-O2 | (2-5-1) | 5% |
| 3-HBB(2F,3F)-O2 | (2-8-1) | 10% |
| 2-BB(2F,3F)B-3 | (2-11-1) | 5% |
| 3-HDhB(2F,3F)-O2 | (2-13-1) | 5% |
| 2-HH-3 | (3-1-1) | 20% |
| 3-HH-4 | (3-1-1) | 7% |
| 3-HH-V1 | (3-1-1) | 3% |
| 3-HHB-1 | (3-5-1) | 4% |
| 3-HHB-3 | (3-5-1) | 3% |
| 5-B(F)BB-2 | (3-8-1) | 5% |

To 100 parts by weight of the composition, 0.1 part by weight of compound (1-1-1-1) and 0.1% by weight of compound (1-1-1-2) both as a first component of the invention, and 0.1 part by weight of polymerizable compound (6-1-2) that is not the first component of the invention were added.

| MAC-VO-BB-MAC | (1-1-1-1) |
|---|---|
| MAC-VO-BB-AC | (1-1-1-2) |
| MAC-B(2F)B-MAC | (6-1-2) |

Characteristics of the composition obtained were as described below.
NI=79.0° C.; Tc<−20° C.; Δn=0.101; Δ∈=−3.0; VHR-1=99.4%; VHR-2=98.7%; VHR-3=98.8%.
A response time of the liquid crystal display device prepared according to the method described in Example M1 was as described below: τ=3.9 ms.

Example M20

| V-HB(2F,3F)-O2 | (2-1-1) | 5% |
|---|---|---|
| 3-H2B(2F,3F)-O2 | (2-2-1) | 10% |
| 3-BB(2F,3F)-O2 | (2-3-1) | 5% |
| 3-HHB(2F,3F)-O2 | (2-5-1) | 8% |
| 5-HHB(2F,3F)-O2 | (2-5-1) | 6% |
| 3-HH1OB(2F,3F)-O2 | (2-7-1) | 5% |
| 3-HBB(2F,3F)-O2 | (2-8-1) | 10% |
| 5-HBB(2F,3F)-O2 | (2-8-1) | 5% |
| 3-HHB(2F,3CL)-O2 | (2-9-1) | 3% |
| 3-HDhB(2F,3F)-O2 | (2-13-1) | 5% |
| 2-HH-3 | (3-1-1) | 22% |
| 3-HH-4 | (3-1-1) | 7% |
| 3-HHB-1 | (3-5-1) | 4% |
| 2-BB(F)B-5 | (3-7-1) | 3% |
| 5-B(F)BB-3 | (3-8-1) | 2% |

To 100 parts by weight of the composition, 0.1 part by weight of compound (1-1) and 0.1 part by weight of compound (1-1-1-2) both as a first component of the invention, and 0.1 part by weight of compound (6-1-2) that is not the first component of the invention were added.

| MAC-VO-BB(F)-MAC | (1-1) |
|---|---|
| MAC-VO-BB-AC | (1-1-1-2) |
| MAC-B(2F)B-MAC | (6-1-2) |

Characteristics of the composition obtained were as described below.

NI=86.1° C.; Tc<−20° C.; Δn=0.098; Δ∈=−3.6; VHR-1=99.2%; VHR-2=98.4%; VHR-3=98.7%.

A response time of the liquid crystal display device prepared according to the method described in Example M1 was as described below: τ=3.9 ms.

Example M21

| | | |
|---|---|---|
| 3-H2B(2F,3F)-O2 | (2-2-1) | 19% |
| 5-BB(2F,3F)-O2 | (2-3-1) | 5% |
| 3-HHB(2F,3F)-O2 | (2-5-1) | 8% |
| 5-HHB(2F,3F)-O2 | (2-5-1) | 7% |
| 3-HBB(2F,3F)-O2 | (2-8-1) | 5% |
| 5-HBB(2F,3F)-O2 | (2-8-1) | 5% |
| 2-BB(2F,3F)B-3 | (2-11-1) | 5% |
| 5-dhBB(2F,3F)-O2 | (2-15-1) | 5% |
| 2-HH-3 | (3-1-1) | 22% |
| 3-HH-5 | (3-1-1) | 3% |
| 3-HH-O1 | (3-1-1) | 3% |
| 3-HHB-1 | (3-5-1) | 5% |
| 3-HHB-O1 | (3-5-1) | 3% |
| 2-B(F)BB-5 | (3-8-1) | 5% |

To 100 parts by weight of the composition, 0.1 part by weight of compound (1-1) and 0.1 part by weight of compound (1-8-1-1) both as a first component of the invention, and 0.1 part by weight of compound (6-1-2) that is not the first component of the invention were added.

| | |
|---|---|
| MAC-VO-BB(F)-MAC | (1-1) |
| MAC-VO-BB(F)B-MAC | (1-8-1-1) |
| MAC-B(2F)B-MAC | (6-1-2) |

Characteristics of the composition obtained were as described below.

NI=81.7° C.; Tc<−20° C.; Δn=0.104; Δ∈=−3.1; VHR-1=99.3%; VHR-2=98.5%; VHR-3=98.7%.

A response time of the liquid crystal display device prepared according to the method described in Example M1 was as described below: τ=4.3 ms.

Example M22

| | | |
|---|---|---|
| V-HB(2F,3F)-O2 | (2-2-1) | 5% |
| 3-H2B(2F,3F)-O2 | (2-2-1) | 13% |
| 5-BB(2F,3F)-O2 | (2-3-1) | 5% |
| 3-HHB(2F,3F)-O2 | (2-5-1) | 8% |
| 5-HHB(2F,3F)-O2 | (2-5-1) | 6% |
| 2-HH1OB(2F,3F)-O2 | (2-7-1) | 5% |
| 3-HBB(2F,3F)-O2 | (2-8-1) | 10% |
| 5-HBB(2F,3F)-O2 | (2-8-1) | 5% |
| 2-HDhB(2F,3F)-O2 | (2-13-1) | 5% |
| 2-HH-3 | (3-1-1) | 22% |
| 3-HH-4 | (3-1-1) | 7% |
| 3-HHB-1 | (3-5-1) | 4% |
| 2-BB(F)B-5 | (3-7-1) | 3% |
| 5-B(F)BB-3 | (3-8-1) | 2% |

To 100 parts by weight of the composition, 0.3 part by weight of compound (1-1-1-3) as a first component of the invention was added.

| | |
|---|---|
| AC-VO-BB-MAC | (1-1-1-3) |

Characteristics of the composition obtained were as described below.

NI=80.0° C.; Tc<−20° C.; Δn=0.096; Δ∈=−3.6; VHR-1=99.0%; VHR-2=98.1%; VHR-3=98.5%.

A response time of the liquid crystal display device prepared according to the method described in Example M1 was as described below: τ=4.6 ms.

Example M23

| | | |
|---|---|---|
| V-HB(2F,3F)-O2 | (2-1-1) | 5% |
| 3-H2B(2F,3F)-O2 | (2-2-1) | 10% |
| 3-BB(2F,3F)-O2 | (2-3-1) | 5% |
| 3-HHB(2F,3F)-O2 | (2-5-1) | 8% |
| 5-HHB(2F,3F)-O2 | (2-5-1) | 6% |
| 2-HH1OB(2F,3F)-O2 | (2-7-1) | 5% |
| 3-HBB(2F,3F)-O2 | (2-8-1) | 10% |
| 2-BB(2F,3F)B-4 | (2-11-1) | 8% |
| 3-HDhB(2F,3F)-O2 | (2-13-1) | 5% |
| 2-HH-3 | (3-1-1) | 20% |
| 3-HH-4 | (3-1-1) | 9% |
| 3-HHB-1 | (3-5-1) | 4% |
| 2-BB(F)B-5 | (3-7-1) | 3% |
| 5-B(F)BB-3 | (3-8-1) | 2% |

To 100 parts, by weight of the composition, 0.285 part by weight of compound (1-1-1-1) and 0.015 part by weight of compound (1-1-1-4) both as a first component of the invention were added.

| | |
|---|---|
| MAC-VO-BB-MAC | (1-1-1-1) |
| AC-VO-BB-AC | (1-1-1-4) |

Characteristics of the composition obtained were as described below.

NI=81.7° C.; Tc<−20° C.; Δn=0.106; Δ∈=−3.3; VHR-1=99.3%; VHR-2=98.7%; VHR-3=98.9%.

A response time of the liquid crystal display device prepared according to the method described in Example M1 was as described below: τ=4.4 ms.

Example M24

| | | |
|---|---|---|
| V-HB(2F,3F)-O2 | (2-1-1) | 5% |
| 3-H2B(2F,3F)-O2 | (2-2-1) | 10% |
| 3-BB(2F,3F)-O2 | (2-3-1) | 5% |
| 3-HHB(2F,3F)-O2 | (2-5-1) | 8% |
| 5-HHB(2F,3F)-O2 | (2-5-1) | 6% |
| 3-HH1OB(2F,3F)-O2 | (2-7-1) | 5% |
| 3-HBB(2F,3F)-O2 | (2-8-1) | 10% |
| 3-HHB(2F,3CL)-O2 | (2-9-1) | 2% |
| 3-HDhB(2F,3F)-O2 | (2-13-1) | 4% |
| 3-dhBB(2F,3F)-O2 | (2-15-1) | 5% |
| 2-HH-3 | (3-1-1) | 22% |
| 5-HB-3 | (3-2-1) | 7% |
| 3-HHB-1 | (3-5-1) | 8% |
| 2-BB(F)B-3 | (3-7-1) | 3% |

To 100 parts by weight of the composition, 0.1 part by weight of compound (1-1), 0.1 part by weight of compound (1-1-1-4) and 0.1 part by weight of compound (1-8-1-2) all as a first component of the invention were added.

| | |
|---|---|
| MAC-VO-BB(CF3)-MAC | (1-1) |
| AC-VO-BB-AC | (1-1-1-4) |
| MAC-VO-BB(2F)B-MAC | (1-8-1-2) |

Characteristics of the composition obtained were as described below.

NI=81.7° C.; Tc<−20° C.; Δn=0.098; Δ∈=−3.5; VHR-1=99.1%; VHR-2=98.5%; VHR-3=98.1%.

A response time of the liquid crystal display device prepared according to the method described in Example M1 was as described below: τ=4.5 ms.

Example M25

| 3-HB(2F,3F)-O4 | (2-1-1) | 5% |
| 5-H2B(2F,3F)-O2 | (2-2-1) | 10% |
| 3-BB(2F,3F)-O2 | (2-3-1) | 5% |
| 3-HHB(2F,3F)-O2 | (2-5-1) | 8% |
| 5-HHB(2F,3F)-O2 | (2-5-1) | 6% |
| 3-HH1OB(2F,3F)-O2 | (2-7-1) | 5% |
| 3-HBB(2F,3F)-O2 | (2-8-1) | 7% |
| 3-HHB(2F,3CL)-O2 | (2-9-1) | 3% |
| 3-HDhB(2F,3F)-O2 | (2-13-1) | 5% |
| 2-HH-3 | (3-1-1) | 22% |
| 3-HH-4 | (3-1-1) | 7% |
| 1-BB-3 | (3-3-1) | 5% |
| 3-HHB-1 | (3-5-1) | 4% |
| 5-B(F)BB-3 | (3-8-1) | 5% |
| 5-HBB(F)B-2 | (3-13-1) | 3% |

To 100 parts by weight of the composition, 0.05 part by weight of compound (1-1-1-4) and 0.2 part by weight of compound (1-8-1-3) both as a first component of the invention, and 0.15 part by weight of compound (6-1-2) that is not the first component of the invention were added.

| AC-VO-BB-AC | (1-1-1-4) |
| MAC-VO-B(2F)BB-MAC | (1-8-1-3) |
| MAC-B(2F)B-MAC | (6-1-2) |

Characteristics of the composition obtained were as described below.

NI=82.8° C.; Tc<−20° C.; Δn=0.099; Δ∈=−3.1; VHR-1=99.1%; VHR-2=98.0%; VHR-3=98.5%.

A response time of the liquid crystal display device prepared according to the method described in Example M1 was as described below: τ=4.2 ms.

Example M26

| V-HB(2F,3F)-O2 | (2-1-1) | 5% |
| 3-H2B(2F,3F)-O2 | (2-2-1) | 10% |
| 5-BB(2F,3F)-O4 | (2-3-1) | 5% |
| 3-HHB(2F,3F)-O2 | (2-5-1) | 8% |
| 5-HHB(2F,3F)-O2 | (2-5-1) | 6% |
| 5-HH1OB(2F,3F)-O2 | (2-7-1) | 5% |
| 3-HBB(2F,3F)-O2 | (2-8-1) | 10% |
| 5-HDhB(2F,3F)-O2 | (2-13-1) | 5% |
| 2-HH-3 | (3-1-1) | 18% |
| 2-HH-5 | (3-1-1) | 7% |
| 3-HB-O2 | (3-2-1) | 7% |
| 3-HHB-3 | (3-5-1) | 5% |
| 3-B(F)BB-2 | (3-8-1) | 4% |
| 5-HBB(F)B-3 | (3-13-1) | 5% |

To 100 parts by weight of the composition, 0.1 part by weight of compound (1-1-1-1), 0.1 part by weight of compound (1-3-1-1) and 0.1 part by weight of compound (1-8-1-2) all as a first component of the invention were added.

| MAC-VO-BB-MAC | (1-1-1-1) |
| MAC-1V-BB-MAC | (1-3-1-1) |
| MAC-VO-BB(2F)B-MAC | (1-8-1-2) |

Characteristics of the composition obtained were as described below.

NI=88.0° C.; Tc<−20° C.; Δn=0.103; Δ∈=−3.3; VHR-1=99.3%; VHR-2=98.5%; VHR-3=98.9%.

A response time of the liquid crystal display device prepared according to the method described in Example M1 was as described below: τ=4.5 ms.

Example M27

| 5-HB(2F,3F)-O2 | (2-1-1) | 5% |
| 3-H2B(2F,3F)-O4 | (2-2-1) | 10% |
| 3-BB(2F,3F)-O2 | (2-3-1) | 5% |
| 3-HHB(2F,3F)-O2 | (2-5-1) | 9% |
| 5-HHB(2F,3F)-O2 | (2-5-1) | 8% |
| 2-HH1OB(2F,3F)-O2 | (2-7-1) | 5% |
| 5-HBB(2F,3F)-O2 | (2-8-1) | 5% |
| 2-BB(2F,3F)B-4 | (2-11-1) | 10% |
| 2-HDhB(2F,3F)-O2 | (2-13-1) | 5% |
| 2-HH-3 | (3-1-1) | 22% |
| 3-HH-4 | (3-1-1) | 7% |
| 3-HHB-1 | (3-5-1) | 4% |
| 5-B(F)BB-3 | (3-8-1) | 5% |

To 100 parts by weight of the composition, 0.1 part by weight of compound (1-1-1-1), 0.15 part by weight of compound (1-1-1-3) and 0.1 part by weight of compound (1-8-1-3) all as a first component of the invention were added.

| MAC-VO-BB-MAC | (1-1-1-1) |
| AC-VO-BB-MAC | (1-1-1-3) |
| MAC-VO-B(2F)BB-MAC | (1-8-1-3) |

Characteristics of the composition obtained were as described below.

NI=80.7° C.; Tc<−20° C.; Δn=0.104; Δ∈=−3.3; VHR-1=99.3%; VHR-2=98.4%; VHR-3=98.5%.

A response time of the liquid crystal display device prepared according to the method described in Example M1 was as described below: τ=4.5 ms.

Example M28

| V-HB(2F,3F)-O3 | (2-1-1) | 5% |
| 3-H2B(2F,3F)-O2 | (2-2-1) | 10% |
| 3-BB(2F,3F)-O2 | (2-3-1) | 5% |
| 5-HHB(2F,3F)-O2 | (2-5-1) | 8% |
| 3-HH1OB(2F,3F)-O2 | (2-7-1) | 5% |
| 3-HBB(2F,3F)-O2 | (2-8-1) | 10% |
| 3-HHB(2F,3CL)-O2 | (2-9-1) | 3% |
| 5-BB(2F,3F)B-2 | (2-11-1) | 10% |
| 3-HDhB(2F,3F)-O2 | (2-13-1) | 5% |
| 2-HH-3 | (3-1-1) | 20% |
| 3-HH-4 | (3-1-1) | 7% |
| 5-HB-3 | (3-2-1) | 3% |
| 3-HHB-1 | (3-5-1) | 3% |
| 2-BB(F)B-5 | (3-7-1) | 3% |
| 5-HBB(F)B-2 | (3-13-1) | 3% |

To 100 parts by weight of the composition, 0.1 part by weight of compound (1-1-1-4), 0.1 part by weight of compound (1-8-1-2) and 0.1 part by weight of compound (1-8-1-3) all as a first component of the invention were added.

| | | |
|---|---|---|
| AC-VO-BB-AC | (1-1-1-4) | |
| MAC-VO-BB(2F)B-MAC | (1-8-1-2) | |
| MAC-VO-B(2F)BB-MAC | (1-8-1-3) | |

Characteristics of the composition obtained were as described below.

NI=81.6° C.; Tc<−20° C.; Δn=0.109; Δ∈=−3.2; VHR-1=99.2%; VHR-2=98.7%; VHR-3=98.9%.

A response time of the liquid crystal display device prepared according to the method described in Example M1 was as described below: τ=4.5 ms.

Example M29

| | | |
|---|---|---|
| 3-HB(2F,3F)-O2 | (2-1-1) | 5% |
| 3-H2B(2F,3F)-O4 | (2-2-1) | 8% |
| 2-BB(2F,3F)-O2 | (2-3-1) | 5% |
| 3-HHB(2F,3F)-O2 | (2-5-1) | 8% |
| 5-HHB(2F,3F)-O2 | (2-5-1) | 6% |
| 3-HH1OB(2F,3F)-O2 | (2-7-1) | 5% |
| 5-HBB(2F,3F)-O2 | (2-8-1) | 5% |
| 3-HDhB(2F,3F)-O2 | (2-13-1) | 8% |
| 5-dhBB(2F,3F)-O2 | (2-15-1) | 5% |
| 2-HH-3 | (3-1-1) | 20% |
| 3-HH-4 | (3-1-1) | 8% |
| 1-BB-3 | (3-3-1) | 5% |
| 3-HHB-1 | (3-5-1) | 4% |
| 5-B(F)BB-2 | (3-8-1) | 5% |
| 5-HBB(F)B-3 | (3-13-1) | 3% |

To 100 parts by weight of the composition, 0.1 part by weight of compound (1-1-1-3) and 0.1 part by weight of compound (1-8-1-2) both as a first component of the invention, and 0.1 part by weight of compound (6-1-2) that is not the first component of the invention were added.

| | | |
|---|---|---|
| AC-VO-BB-MAC | (1-1-1-3) | |
| MAC-VO-BB(2F)B-MAC | (1-8-1-2) | |
| MAC-B(2F)B-MAC | (6-1-2) | |

Characteristics of the composition obtained were as described below.

NI=84.1° C.; Tc<−20° C.; Δn=0.100; Δ∈=−3.2; VHR-1=99.2%; VHR-2=98.4%; VHR-3=98.7%.

A response time of the liquid crystal display device prepared according to the method described in Example M1 was as described below: τ=4.3 ms.

The compositions according to Examples M1 to M29 have a shorter response time in comparison with the composition according to Comparative Example M1. Thus, the liquid crystal composition according to the invention is so much superior in characteristics to the liquid crystal composition shown in Comparative Example M1.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

What is claimed is:

1. A liquid crystal composition containing at least one compound selected from the group of compounds represented by formula (1) as a first component, at least one compound selected from the group of compounds represented by formula (2) as a second component, and at least one compound selected from the group of compounds represented by formula (3-1) as a third component:

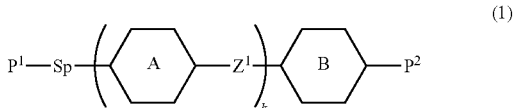
(1)

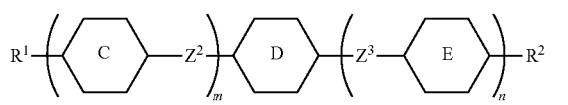
(2)

(3-1)

wherein $P^1$ and $P^2$ are independently a group selected from groups represented by formula (P-1) to formula (P-6);

(P-1)

(P-2)

(P-3)

(P-4)

(P-5)

(P-6)

$R^1$ and $R^2$ are independently alkyl having 1 to 12 carbons, alkoxy having 1 to 12 carbons or alkenyl having 2 to 12 carbons; $R^3$ is independently ethyl or vinyl; $R^4$ is propyl; ring A and ring B are independently 1,4-cyclohexylene, 1,4-cyclohexenylene, 1,4-phenylene, tetrahydropyran-2,5-diyl, 1,3-dioxane-2,5-diyl or pyrimidine-2,5-diyl, and in the groups, at least one of hydrogen may be replaced by halogen or alkyl having 1 to 12 carbons, or alkyl having 1 to 12 carbons in which at least one of hydrogen is replaced by halogen; ring C and ring E are independently 1,4-cyclohexylene, tetrahydropyran-2,5-diyl, 1,4-phenylene, 2-fluoro-1,4-phenylene or 3-fluoro-1,4-phenylene; ring D is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; Sp is —C≡C—O—, —C≡C—, —C—C≡C—, —O—, —C—C—O—, or —(CO)—O—; $Z^1$, $Z^2$, and $Z^3$ are independently a single bond, ethylene, methyleneoxy or carbonyloxy; k is 0, 1, 2 or 3; m is 1, 2 or 3; and n is 0 or 1, and a sum of m and n is 3 or less.

2. The liquid crystal composition according to claim 1, wherein the first component is at least one compound selected from the group of compounds represented by formula (1-1) to formula (1-8):

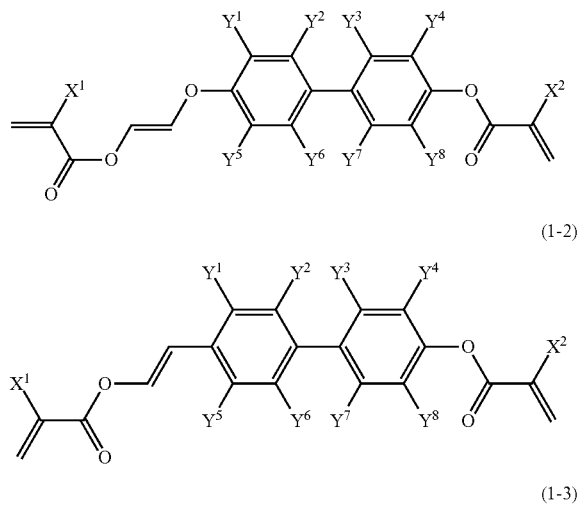

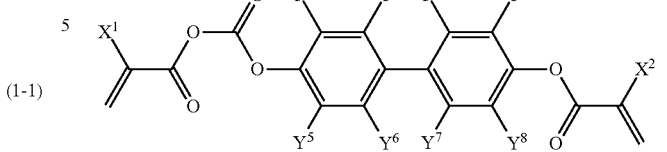

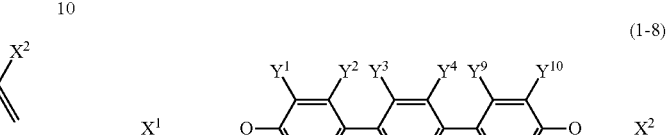

wherein $Y^1$ to $Y^{12}$ are independently hydrogen, halogen, alkyl having 1 to 12 carbons or trifluoromethyl; and $X^1$ and $X^2$ are independently hydrogen or methyl.

3. The liquid crystal composition according to claim 1, wherein the first component is at least one compound selected from the group of compounds represented by formula (1-1) to formula (1-8):

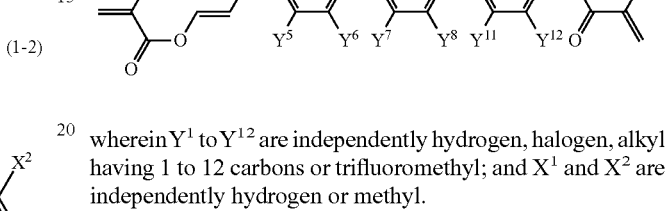

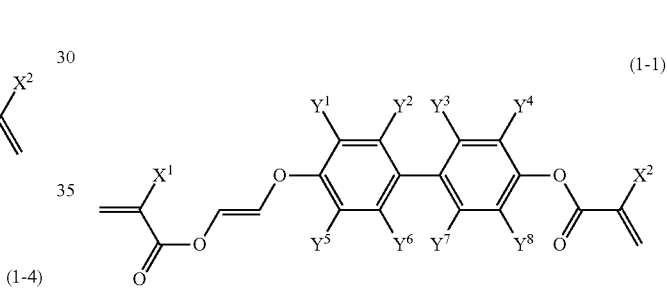

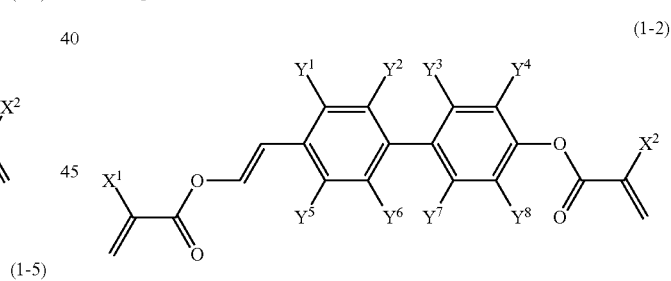

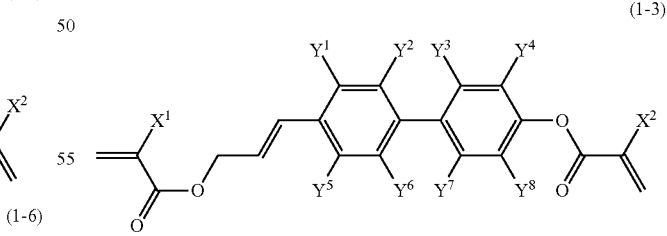

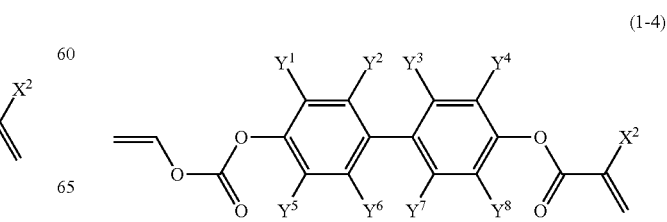

(1-5)
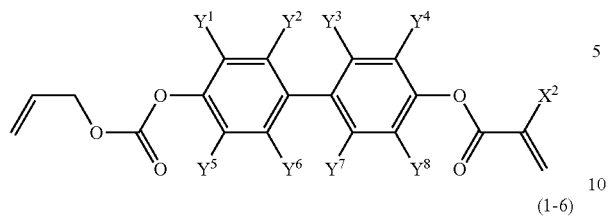

(1-6)
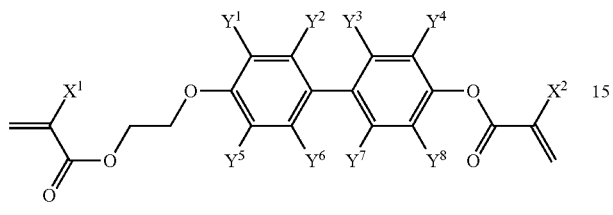

(1-7)
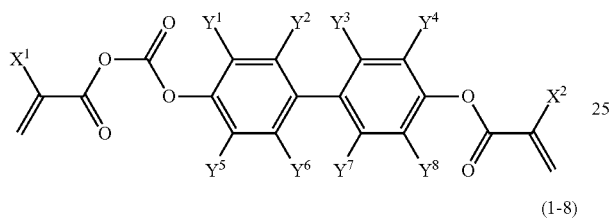

(1-8)
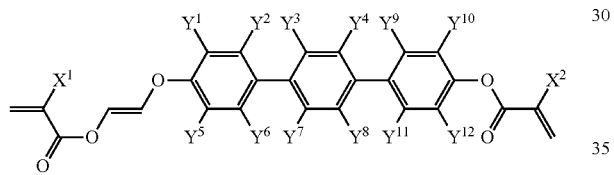

wherein $Y^1$ to $Y^{12}$ are hydrogen; and $X^1$ and $X^2$ are independently hydrogen or methyl.

4. The liquid crystal composition according to claim 1, wherein the first component is at least one compound selected from the group of compounds represented by formula (1-1) to formula (1-8):

(1-1)
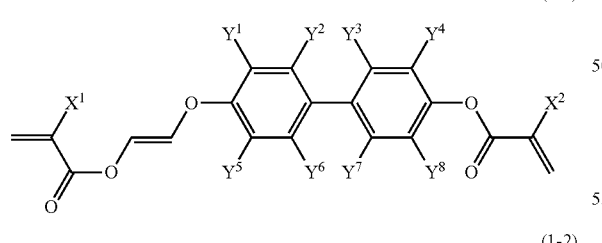

(1-2)
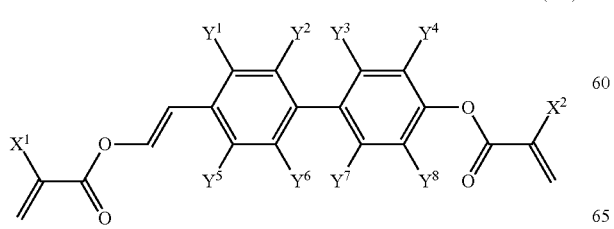

(1-3)
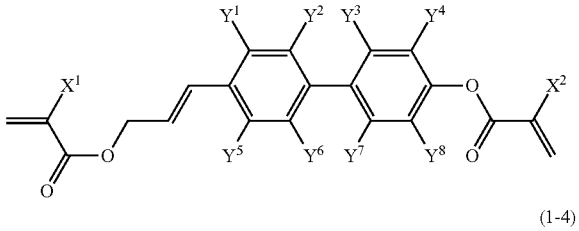

(1-4)
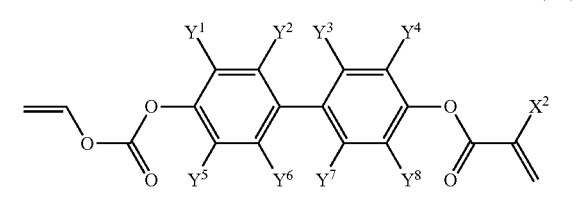

(1-5)
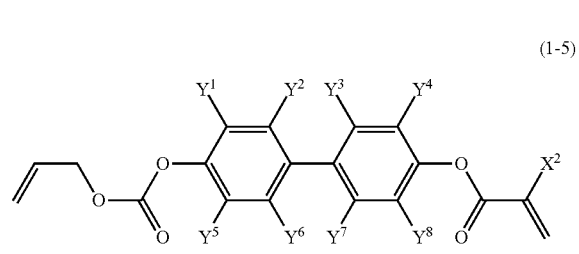

(1-6)
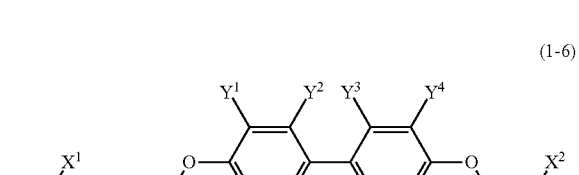

(1-7)
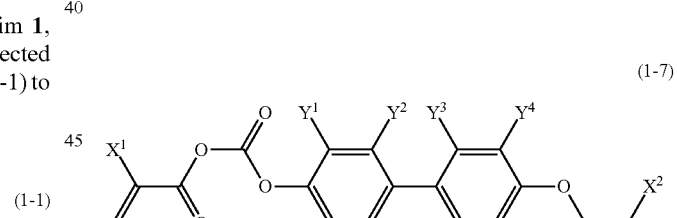

(1-8)
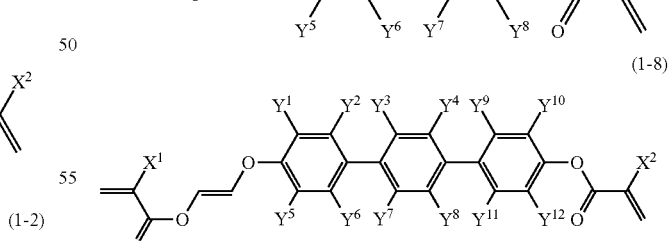

wherein $X^1$ and $X^2$ are independently hydrogen or methyl, and in formula (1-1) to formula (1-7), at least one of $Y^1$ to $Y^8$ is fluorine or trifluoromethyl, and in formula (1-8), at least one of $Y^1$ to $Y^{12}$ is fluorine or trifluoromethyl.

5. The liquid crystal composition according to claim 1, wherein the first component is at least one compound selected from the group of compounds represented by formula (1-1):

(1-1)

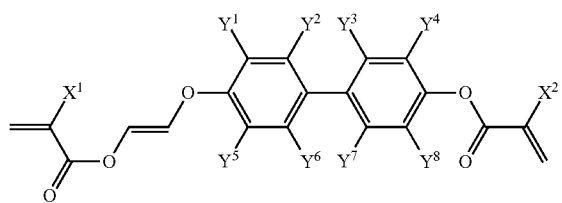

wherein $Y^1$ to $Y^8$ are independently hydrogen, halogen, alkyl having 1 to 12 carbons or trifluoromethyl; and $X^1$ and $X^2$ are independently hydrogen or methyl.

6. The liquid crystal composition according to claim 1, wherein the first component is at least one compound selected from the group of compounds represented by formula (1-2):

(1-2)

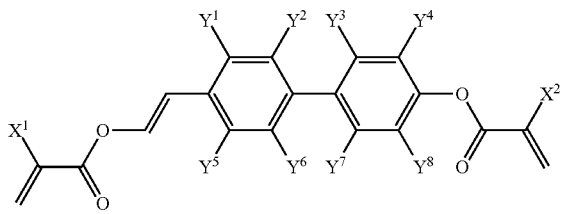

wherein $Y^1$ to $Y^8$ are independently hydrogen, halogen, alkyl having 1 to 12 carbons or trifluoromethyl; and $X^1$ and $X^2$ are independently hydrogen or methyl.

7. The liquid crystal composition according to claim 1, wherein the first component comprises at least two or more compounds selected from the group of compounds represented by formula (1) according to claim 1.

8. The liquid crystal composition according to claim 1, wherein the first component is at least one compound selected from the group of compounds represented by formula (1) according to claim 1, and further contains a polymerizable compound other than the compounds represented by formula (1) according to claim 1.

9. The liquid crystal composition according to claim 1, wherein the second component is at least one compound selected from the group of compounds represented by formula (2-1) to formula (2-19):

(2-1)

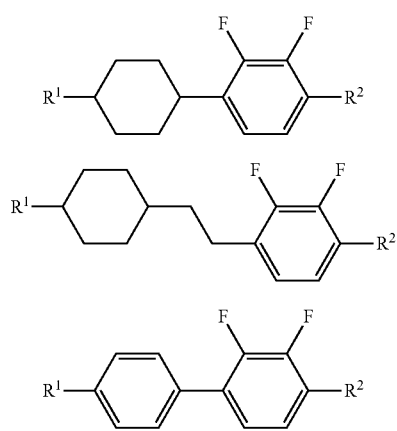

(2-4)
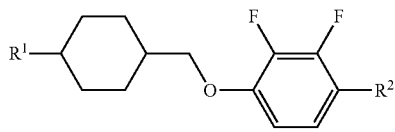

(2-5)
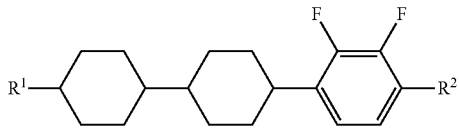

(2-6)
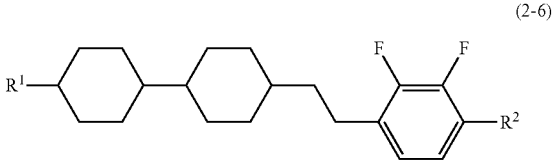

(2-7)
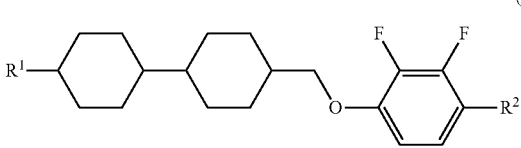

(2-8)
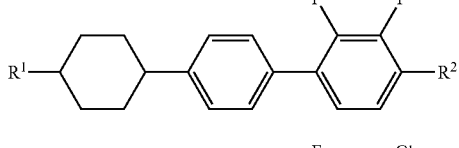

(2-9)
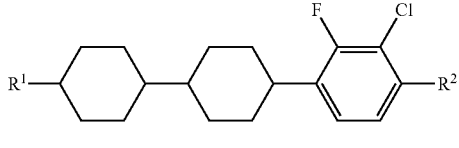

(2-10)
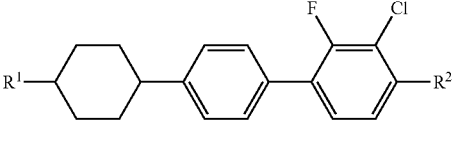

(2-11)
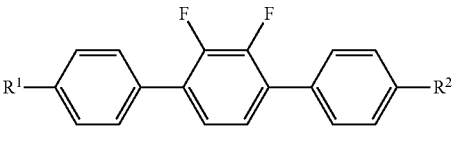

(2-12)
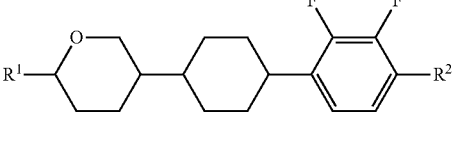

(2-13)
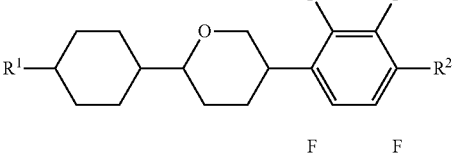

(2-14)
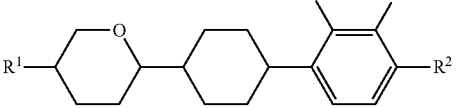

-continued

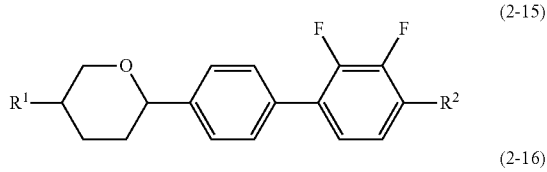
(2-15)

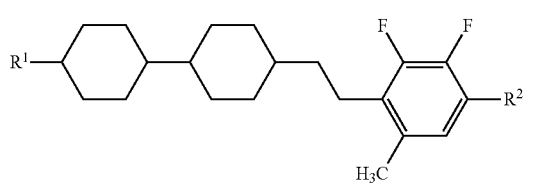
(2-16)

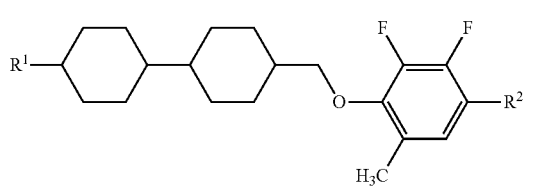
(2-17)

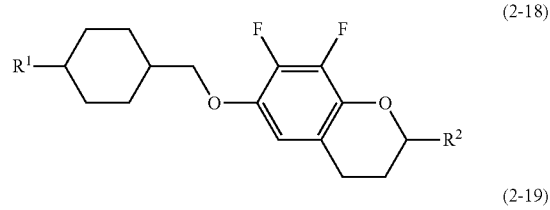
(2-18)

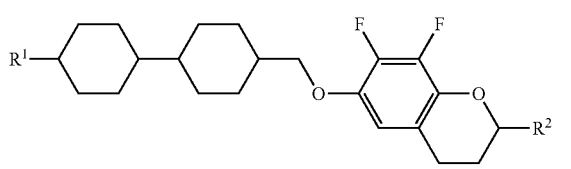
(2-19)

wherein $R^1$ and $R^2$ are independently alkyl having 1 to 12 carbons, alkoxy having 1 to 12 carbons or alkenyl having 2 to 12 carbons.

10. The liquid crystal composition according to claim 1, wherein a ratio of the second component is in the range of 10% by weight to 80% by weight, and a ratio of the third component is in the range of 20% by weight to 90% by weight, based on the weight of a liquid crystal composition excluding the first component and a polymerizable compound other than the first component, and a ratio of the first component and the polymerizable compound other than the first component is in the range of 0.03 part by weight to 10 parts by weight based on 100 parts by weight of the liquid crystal composition excluding the first component and the polymerizable compound other than the first component.

11. The liquid crystal composition according to claim 1, further containing a polymerization initiator.

12. The liquid crystal composition according to claim 1, further containing a polymerization inhibitor.

13. The liquid crystal composition according to claim 1, wherein a maximum temperature of a nematic phase is 70° C. or higher, an optical anisotropy (25° C.) at a wavelength of 589 nanometers is 0.08 or more, and a dielectric anisotropy (25° C.) at a frequency of 1 kHz is −2 or less.

14. A polymer sustained alignment (PSA) liquid crystal display device, comprising two substrates including an electrode layer on at least one of the substrates, and arranging between the two substrates a liquid crystal material containing a compound in which a polymerizable compound in the liquid crystal composition according to claim 1 is polymerized.

15. The liquid crystal display device according to claim 14, wherein an operating mode in the liquid crystal display device is a TN mode, a VA mode, an OCB mode, an IPS mode or a FFS mode, and a driving mode in the liquid crystal display device is an active matrix mode.

16. A method for manufacturing a liquid crystal display device,
wherein the liquid crystal display device is manufactured by polymerizing the polymerizable compound by subjecting the liquid crystal compound according to claim 1 as arranged between two substrates to irradiation with light under a voltage application state.

* * * * *